(12) United States Patent
Taki et al.

(10) Patent No.: US 12,198,694 B2
(45) Date of Patent: Jan. 14, 2025

(54) INFORMATION PROCESSING APPARATUS AND INFORMATION PROCESSING METHOD

(71) Applicant: Sony Group Corporation, Tokyo (JP)

(72) Inventors: Yuhei Taki, Tokyo (JP); Yasuo Kabe, Tokyo (JP); Hiro Iwase, Tokyo (JP); Kunihito Sawai, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 284 days.

(21) Appl. No.: 17/794,633

(22) PCT Filed: Jan. 12, 2021

(86) PCT No.: PCT/JP2021/000600
§ 371 (c)(1),
(2) Date: Jul. 22, 2022

(87) PCT Pub. No.: WO2021/153201
PCT Pub. Date: Aug. 5, 2021

(65) Prior Publication Data
US 2023/0064042 A1    Mar. 2, 2023

(30) Foreign Application Priority Data
Jan. 31, 2020    (JP) ................................ 2020-014529

(51) Int. Cl.
*G10L 15/22*    (2006.01)
*G10L 15/08*    (2006.01)

(52) U.S. Cl.
CPC .............. *G10L 15/22* (2013.01); *G10L 15/08* (2013.01); *G10L 2015/226* (2013.01)

(58) Field of Classification Search
None
See application file for complete search history.

(56) References Cited

U.S. PATENT DOCUMENTS

2021/0174702 A1* 6/2021 Ishii .................... G10L 15/02

FOREIGN PATENT DOCUMENTS

| JP | 11-249773 A | 9/1999 |
|----|-------------|--------|
| JP | 2012-32557 A | 2/2012 |
| JP | 2016-42345 A | 3/2016 |
| JP | 2017117236 A | 6/2017 |
| JP | 2017-211596 A | 11/2017 |
| JP | 2018077791 A | 5/2018 |

OTHER PUBLICATIONS

Ryo Ishii et al: Analysis of Respiration for Prediction of "Who Will Be Next Speaker and When?" in Multi-Party Meetings, Multimodal Interaction, ACM, 2 Penn Plaza, Suite 701 New York NY 10121-0701 USA, Nov. 12, 2014 (Nov. 12, 2014), pp. 18-25, XP058061242,DOI: 10.1145/2663204.2663271ISBN: 978-1-4503-2885-2.

International Search Report and Written Opinion mailed on Mar. 9, 2021, received for PCT Application PCT/JP2021/000600, filed on Jan. 12, 2021, 9 pages including English Translation.

* cited by examiner

*Primary Examiner* — Stella L. Woo
(74) *Attorney, Agent, or Firm* — XSENSUS LLP

(57) ABSTRACT

An information processing apparatus according to the present disclosure includes an acquisition unit that acquires inspiration information indicating inspiration of a user, and a prediction unit that predicts whether or not the user utters after the inspiration of the user on the basis of the inspiration information acquired by the acquisition unit.

20 Claims, 18 Drawing Sheets

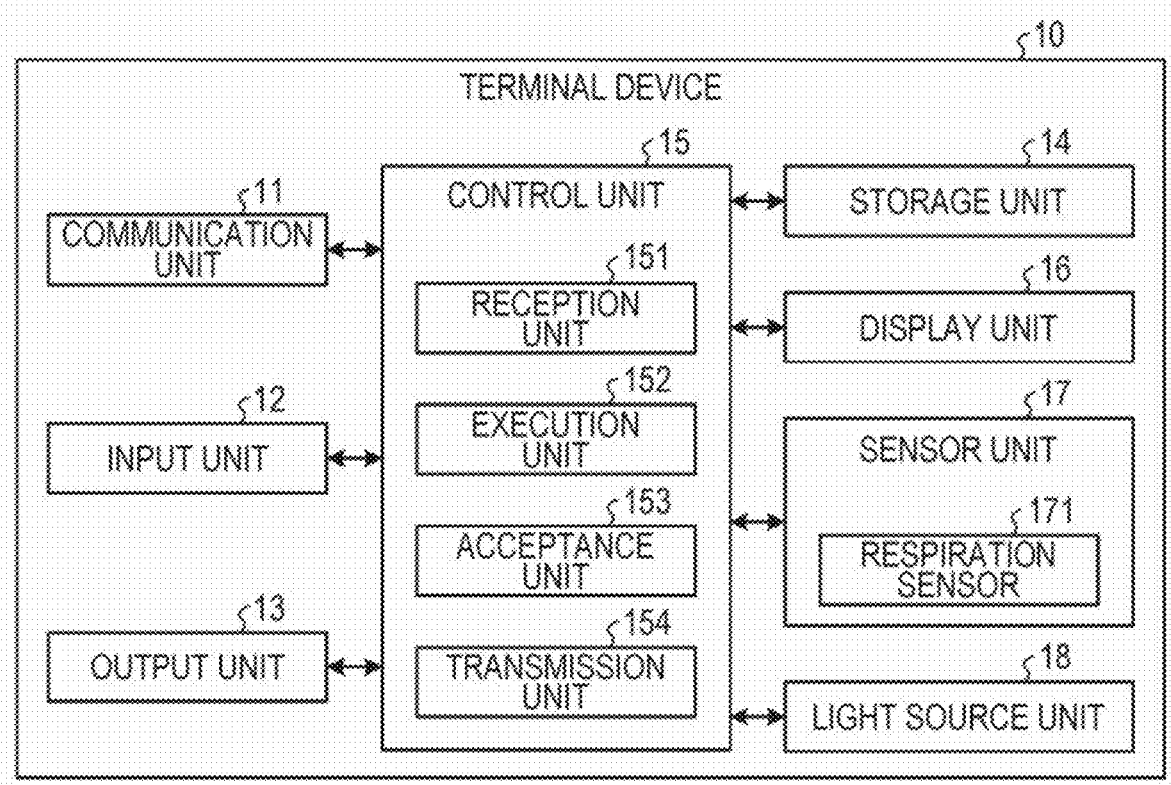

INFORMATION PROCESSING APPARATUS AND INFORMATION PROCESSING METHOD

CROSS-REFERENCE TO RELATED APPLICATIONS

The present application is based on PCT filing PCT/JP2021/000600, filed Jan. 12, 2021, which claims priority to JP 2020-014529, filed Jan. 31, 2020, the entire contents of each are incorporated herein by reference.

TECHNICAL FIELD

The present disclosure relates to an information processing apparatus and an information processing method.

BACKGROUND ART

In recent years, a technology of a voice interaction system that communicates (interacts) with a user by voice has been provided. For example, a technology for determining an utterance timing in a voice interaction system is known (for example, Patent Document 1).

CITATION LIST

Patent Document

Patent Document 1: Japanese Patent Application Laid-Open No. 2017-211596

SUMMARY OF THE INVENTION

Problems to be Solved by the Invention

According to the related art, an utterance timing of a voice interaction system is determined on the basis of a timing at which respiration of a user changes from exhalation to inspiration.

However, in the related art, it is not always possible to appropriately predict presence or absence of the utterance of the user. For example, in the related art, only the timing at which the system side utters to the user is determined, and in such a technology, it is difficult to predict whether or not the user will utter. Therefore, it is desired to appropriately predict the presence or absence of the utterance of the user.

Therefore, the present disclosure proposes an information processing apparatus and an information processing method capable of appropriately predicting presence or absence of an utterance of a user.

Solutions to Problems

In order to solve the above problem, according to an aspect of the present disclosure, there is provided an information processing apparatus including: an acquisition unit that acquires inspiration information indicating inspiration of a user; and a prediction unit that predicts whether or not the user utters after the inspiration of the user on a basis of the inspiration information acquired by the acquisition unit.

BRIEF DESCRIPTION OF DRAWINGS

FIG. 7 is a diagram illustrating an example of a threshold information storage unit according to one embodiment of the present disclosure.

FIG. 8 is a diagram illustrating a configuration example of a terminal device according to one embodiment of the present disclosure.

MODE FOR CARRYING OUT THE INVENTION

Figure 1:
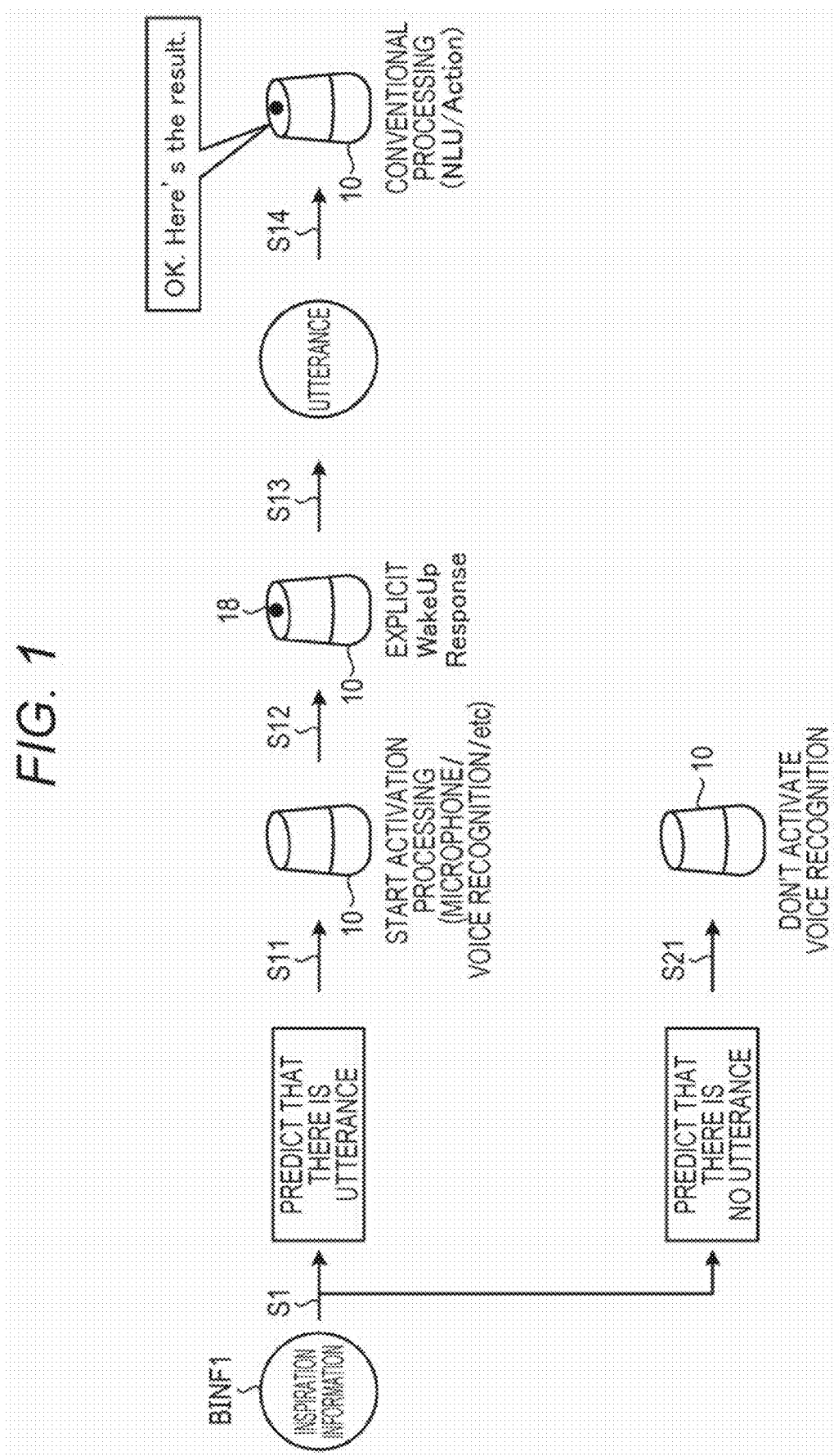
FIG. 1 is a diagram illustrating an example of information processing according to one embodiment of the present disclosure.

Hereinafter, embodiments of the present disclosure will be described in detail with reference to the drawings. Note that the information processing apparatus and the information processing method according to the present application are not limited by the embodiments. Furthermore, in each of the following embodiments, the same parts are denoted by the same reference numerals, and redundant description will be omitted.

The present disclosure will be described according to the following order of items.

1. Embodiments
1-1. Overview of information processing according to embodiment of present disclosure
1-1-1. Background, effects, and the like
1-1-2. Sensor example
1-1-2-1. Contact type
1-1-2-2. Non-contact type
1-2. Configuration of information processing system according to embodiment
1-3. Configuration of information processing apparatus according to embodiment
1-4. Configuration of terminal device according to embodiment
1-5. Procedure of information processing according to embodiment
1-5-1. Procedure of processing according to information processing apparatus
1-5-2. Procedure of processing according to information processing system
1-6. Processing example using classification result
1-6-1. Example of omission of activation word by respiration state
1-6-2. Example of switching local/cloud voice recognition
1-6-3. Modification example of voice recognition dictionary
1-6-4. Modification example of UI selected according to inspiration state
1-6-5. Modification example of system response
2. Other embodiments
2-1. Configuration example in which prediction processing and the like are performed on client side
2-2. Other configuration examples
2-3. Others
3. Effects according to present disclosure
4. Hardware configuration

1. Embodiment

1-1. Overview of Information Processing According to Embodiment of Present Disclosure FIG. 1 is a diagram illustrating an example of information processing according to one embodiment of the present disclosure. The information processing according to one embodiment of the present disclosure is achieved by an information processing system 1 (see FIG. 5) including a server apparatus 100 (see FIG. 6) and a terminal device 10 (see FIG. 8).

The server apparatus 100 is an information processing apparatus that executes the information processing according to one embodiment. The server apparatus 100 predicts whether or not a user utters after inspiration of the user on the basis of inspiration information indicating the inspiration of the user. The example of FIG. 1 illustrates a case where sensor information detected by a respiration sensor 171 (see FIG. 8) of the terminal device 10 used by the user is used as the inspiration information. Note that in the example of FIG. 1, the case where the inspiration information indicating the inspiration of the user is detected by the respiration sensor 171 using the millimeter wave radar is illustrated. However, the present invention is not limited to the millimeter wave radar, and any sensor may be used as long as the inspiration information of the user can be detected.

This point will be described later. Hereinafter, FIG. 1 will be specifically described. Hereinafter, a case where the server apparatus 100 performs prediction processing of predicting whether or not the user U1 utters after the inspiration of a user U1 using the inspiration information indicating the inspiration of the user U1 detected by the terminal device 10 will be described as an example. Note that, in FIG. 1, a case where the server apparatus 100 performs prediction processing (information processing) will be described as an example, but the terminal device 10 may perform the prediction processing (information processing). This point will be described later.

First, in the example of FIG. 1, the server apparatus 100 acquires inspiration information BINF1 indicating the inspiration of the user U1. For example, the server apparatus 100 acquires the inspiration information BINF1 indicating the inspiration of the user U1 from the terminal device 10 used by the user U1. The example of FIG. 1 illustrates a case where the terminal device 10 is a smart speaker. Note that the terminal device 10 is not limited to a smart speaker, and may be any device such as a smartphone, but this point will be described later in detail.

The server apparatus 100 performs the prediction processing using the inspiration information BINF1 indicating the inspiration of the user U1 (Step S1). The server apparatus 100 calculates a score using the inspiration information BINF1. Then, the server apparatus 100 compares the calculated score with a threshold to predict whether or not the user U1 utters after the inspiration corresponding to the inspiration information BINF1. In a case where the calculated score is larger than the threshold, the server apparatus 100 predicts that the user U1 utters after the inspiration corresponding to the inspiration information BINF1.

Figure 2:
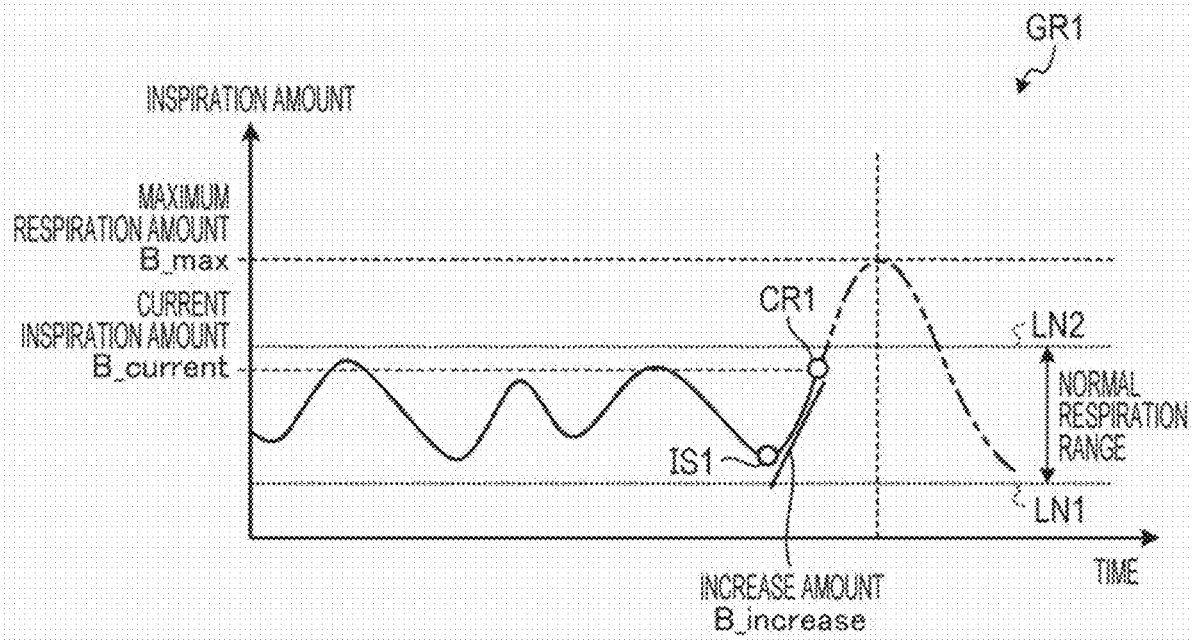
FIG. 2 is a diagram illustrating an example of inspiration information of a user.
Figure 3:
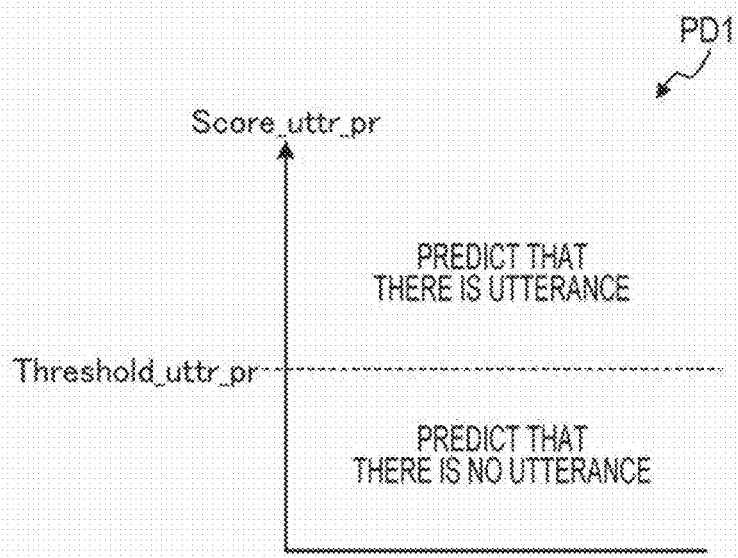
FIG. 3 is a diagram illustrating an example of prediction using inspiration of the user.

Hereinafter, the above-described prediction processing performed by the server apparatus 100 will be specifically described with reference to FIGS. 2 and 3. FIG. 2 is a diagram illustrating an example of inspiration information of the user. FIG. 3 is a diagram illustrating an example of prediction using the inspiration of the user.

A graph GR1 in FIG. 2 is a graph illustrating a relationship between a time and an inspiration amount, where a horizontal axis represents time and a vertical axis represents the inspiration amount. A range between lines LN1 and LN2 in the graph GR1 indicates a range of normal respiration (normal respiration range) of the user U1. For example, the respiration amount corresponding to the line LN1 indicates a lower limit value of the inspiration amount at the time of the normal respiration. Furthermore, for example, the respiration amount corresponding to the line LN2 indicates an upper limit value of the inspiration amount at the time of the normal respiration. For example, at the normal time of the user U1, the user U1 repeats respiration with the inspiration amount in the range of respiration (normal respiration range) between the line LN1 and the line LN2.

Furthermore, a current inspiration amount "B_current" that is an inspiration amount at a current time CR1 in the graph GR1 indicates the latest inspiration amount at a detection time (current time) of the inspiration information BINF1. Furthermore, for example, an increase amount "B_increase" in the graph GR1 indicates a change (increase amount) in the inspiration amount at a current value CR1.

For example, the inspiration information BINF1 includes the current inspiration amount "B_current" which is an inspiration amount of the current value CR1 in FIG. 2 and the increase amount "B_increase". Note that the inspiration information BINF1 may include a transition of the inspiration amount between an inspiration start time point IS1 immediately before the current value CR1 in FIG. 2 and the current value CR1. In this case, the server apparatus 100 may calculate the increase amount "B_increase" from the transition of the inspiration amount. Note that the increase amount "B_increase" may be information indicating a ratio of the increase amount of the inspiration amount with respect to the lapse of time (increase amount). For example, the increase amount "B_increase" may be an inclination (change rate).

The server apparatus 100 calculates an utterance prediction score "Score_uttr_pr", which is a score used for utterance prediction, using the current inspiration amount "B_current", the increase amount "B_increase", and the following Formula (1).

[Mathematical formula 1]

$$Score\_uttr\_pr = a*B\_current + b*B\_increase \quad (1)$$

"a" and "b" in the above Formula (1) represent predetermined constants. Note that the above Formula (1) is an example of calculation of the utterance prediction score "Score_uttr_pr", and various expression may be used to calculate the utterance prediction score "Score_uttr_pr".

Then, the server apparatus 100 predicts whether or not the user U1 utters using an utterance presence/absence prediction threshold "Threshold_uttr_pr" that is a threshold used for prediction of the presence or absence of an utterance. The server apparatus 100 compares the utterance prediction score "Score_uttr_pr" with the utterance presence/absence prediction threshold "Threshold_uttr_pr" to predict whether or not the user U1 utters. In other words, the server apparatus 100 classifies an utterance type according to the value of the utterance prediction score "Score_uttr_pr".

As illustrated in a prediction result PD1 in FIG. 3, the server apparatus 100 compares the utterance prediction score "Score_uttr_pr" with the utterance presence/absence prediction threshold "Threshold_uttr_pr" to predict whether or not the user U1 utters.

In the example of FIG. 3, the server apparatus 100 predicts that the user U1 utters in a case where the utterance prediction score "Score_uttr_pr" is larger than the utterance presence/absence prediction threshold "Threshold_uttr_pr". In this case, the server apparatus 100 determines that there is a high possibility that an utterance will be made after the current inspiration, and executes pre-processing necessary for voice recognition. The server apparatus 100 executes the pre-processing necessary for voice recognition as soon as it is predicted that the user U1 utters after the inspiration ends. In the example of FIG. 2, the server apparatus 100 executes the pre-processing necessary for the voice recognition before the user U1 ends the inspiration (before reaching the maximum inspiration amount "B_max").

Furthermore, in the example of FIG. 3, in a case where the utterance prediction score "Score_uttr_pr" is equal to or less than the utterance presence/absence prediction threshold "Threshold_uttr_pr", the server apparatus 100 predicts that the user U1 does not utter. In this case, the server apparatus 100 determines that no utterance is assumed after the current inspiration, and does not perform pre-activation.

Note that which one of the cases equal to the threshold is included may be appropriately set. The server apparatus 100 may predict that the user U1 will utter in a case where the utterance prediction score "Score_uttr_pr" is the utterance presence/absence prediction threshold "Threshold_uttr_pr" or more, and predict that the user U1 will not utter in a case where the utterance prediction score "Score_uttr_pr" is less than the utterance presence/absence prediction threshold "Threshold_uttr_pr".

In this manner, the server apparatus 100 compares the utterance prediction score "Score_uttr_pr" with the utterance presence/absence prediction threshold "Threshold_uttr_pr" to predict whether or not the user U1 utters after the inspiration corresponding to the inspiration information BINF1. Note that each threshold such as the utterance presence/absence prediction threshold "Threshold_uttr_pr" may be increased or decreased in accordance with a change in the normal respiration range due to a change in a motion state and the like of the user.

As described above, the utterance prediction score "Score_uttr_pr" is a value obtained by adding a current respiration amount and the increase amount. The server apparatus 100 uses the utterance prediction score "Score_uttr_pr" to predict the possibility of subsequent utterance from the current inspiration amount and the increase amount. Therefore, the server apparatus 100 can determine the utterance possibility even before reaching the maximum point of the inspiration, and can use the utterance possibility for system preparation in advance.

Figure 4:
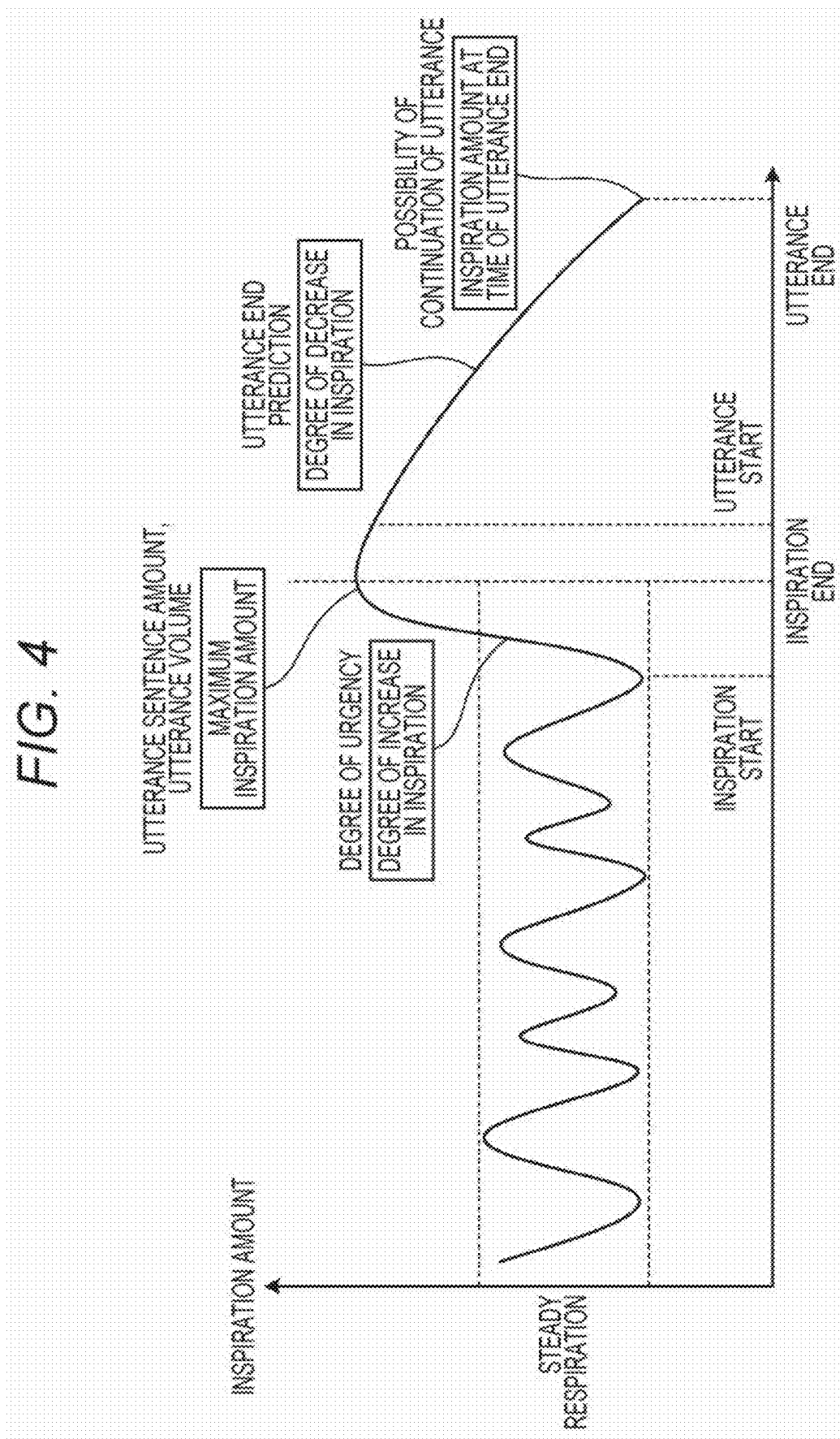
FIG. 4 is a diagram illustrating an example of a relationship between the inspiration and an utterance of the user.

Here, the relationship between the inspiration and utterance of the user will be briefly described with reference to FIG. 4. FIG. 4 is a diagram illustrating an example of a relationship between the inspiration and utterance of the user. A waveform illustrated in FIG. 4 illustrates an example of transition of the inspiration amount from normal respiration (steady respiration) of the user to the end of utterance after utterance. As described above, the inspiration amount changes so as to increase more than the steady respiration when the user utters, and decrease with the utterance. For example, a degree of increase in inspiration in the inspiration information regarding the inspiration is related to a degree of urgency and the like. Furthermore, for example, the maximum inspiration amount of the inspiration information regarding the inspiration is related to an utterance sentence amount, an utterance volume, and the like. Furthermore, for example, a degree of decrease in inspiration in the inspiration information regarding the inspiration can be used for utterance end prediction and the like. Furthermore, for example, the inspiration amount at the time of the utterance end in the inspiration information regarding the inspiration can be used for prediction of a possibility of continuation of the utterance, and the like.

Furthermore, examples of the possibility of being able to be predicted (estimated) from respiration related to utterance include the following information. For example, before utterance, whether or not the utterance is for device operation, the utterance sentence amount, the degree of urgency, and the like are given as examples. Furthermore, for example, during the utterance, whether or not the end of the utterance is approaching can be cited as an example. Furthermore, for example, whether or not there is a possibility that the next utterance will continue after the utterance can be cited as an example. Note that the above is an example, and the server apparatus 100 may predict (estimate) various types of information regarding the utterance of the user using the information regarding the inspiration of the user as described above. In this manner, the server apparatus 100 can predict (estimate) various types of information regarding the utterance of the user by using the information regarding the inspiration of the user as described above.

Furthermore, a waveform at a time point before the current time CR1 indicated by a two-dot chain line in the graph GR1 in FIG. 2 indicates a predicted value of the respiration amount. The server apparatus 100 may predict the respiration amount at a time point before the current time CR1 on the basis of the transition of the inspiration amount up to the current time CR1 or the past history of the respiration of the user U1. In this case, the server apparatus 100 can predict the maximum inspiration amount "B_max" indicating the maximum inspiration amount reached by the inspiration corresponding to the current time CR1. Therefore, the server apparatus 100 can perform processing in advance using a maximum respiration amount (maximum inspiration amount) to be described later. Furthermore, the server apparatus 100 may predict whether or not the user utters by using the inspiration amount (initial inspiration amount) at the time when the user finishes exhalation (expiration) and starts inspiration and the increase amount of the exhalation from that time. In this case, in the example of FIG. 2, the server apparatus 100 predicts whether or not the user utters using the inspiration amount (initial inspiration amount) at the inspiration start time point IS1 and the increase amount from the inspiration start time point IS1. Therefore, the server apparatus 100 can predict whether or not the user utters in a short time after the user starts exhalation.

Note that the processing using the above-described Formula (1) is an example, and the server apparatus 100 may perform the prediction processing by various methods without being limited to the above-described processing. For example, the server apparatus 100 may perform the prediction processing using a technology regarding machine learning. In this case, server apparatus 100 may perform the prediction processing using the model that outputs the score in a case where the inspiration information is input. The server apparatus 100 may perform the prediction processing using a model that outputs a higher score as the possibility that the user utters after the inspiration corresponding to the inspiration information is higher. For example, the server apparatus 100 may learn the model by using learning data including a combination of the inspiration information indicating inspiration of the user and information indicating presence or absence of an utterance after the inspiration, or may acquire the model from an external information processing apparatus.

Returning to FIG. 1, the description will be continued. In a case where it is predicted in Step S1 that there is an utterance, the information processing system 1 starts activation processing (Step S11). The information processing system 1 performs pre-processing necessary for voice recognition. For example, the information processing system 1 performs processing such as microphone activation and communication connection (connection to a cloud) between a client and a server. For example, server apparatus 100 instructs terminal device 10 to activate the microphone or activate the voice recognition. The terminal device 10 activates the microphone and activates the voice recognition. As described above, in a case where it is predicted that there is an utterance, the information processing system 1 executes pre-processing necessary for voice recognition in a pre-read manner.

Then, the information processing system 1 causes the user U1 to recognize activation (Step S12). The information processing system 1 performs processing of clearly indicating activation of voice recognition and the like by outputting sound or light from the terminal device 10. The terminal device 10 performs WakeUpResponse (hereinafter, also simply referred to as "activation notification") by emitting a notification sound or light indicating activation of voice recognition. In the example of FIG. 1, the terminal device 10 causes the user U1 to recognize the activation by turning on a light source unit 18. Therefore, the user U1 can recognize that voice input has become possible.

Then, the user U1 performs an utterance (Step S13). For example, the user U1 performs voice input requesting predetermined information to the terminal device 10. The user U1 performs voice input requesting the terminal device 10 to perform search processing.

Then, the information processing system 1 performs conventional processing (processing of the voice interaction system) on the input by the user U1 (Step S14). For example, the information processing system 1 interprets an input of the user by natural language understanding (NLU) and executes corresponding processing (Action). The server apparatus 100 or the terminal device 10 interprets the input of the user by the natural language understanding (NLU) and executes the corresponding processing (Action). In the example of FIG. 1, the terminal device 10 performs voice output processing in response to the request of the user U1, "OK. Here's the result . . . ".

Meanwhile, in a case where it is predicted in Step S1 that there is no utterance, the information processing system 1 does not start the activation processing (Step S11). The information processing system 1 does not activate the voice recognition. The terminal device 10 does not start the voice recognition.

As described above, the information processing system 1 can omit the activation word due to the pre-utterance respiration state by determining whether or not to activate voice recognition and the like using the utterance prediction result on the basis of the inspiration of the user.

1-1-1. Background, Effects, and the Like

In an existing voice user interface (UI), since a state of a user who utters is not considered, various user burdens may be imposed. For example, the user needs to input (by voice) an activation word or operate an activation button.

Meanwhile, the information processing system 1 detects a respiration state before the user performs an utterance, and dynamically changes a voice UI system according to the state. Therefore, the information processing system 1 can omit the activation word at the time of respiration before performing a request utterance to the system. Therefore, the information processing system 1 can improve usability.

1-1-2. Sensor Example

In the example of FIG. 1, the case where the millimeter wave radar is used as an example of the respiration sensor 171 that detects the inspiration information indicating the inspiration of the user has been described, but the respiration sensor 171 is not limited to the millimeter wave radar, and may be any sensor as long as the inspiration information of the user can be detected. This point will be described below by way of example.

1-1-2-1. Contact Type

In the example of FIG. 1, the detection of the inspiration information using the respiration sensor 171 using the millimeter wave radar, that is, the non-contact type sensor has been described as an example, but the sensor used for the detection (acquisition) of the inspiration information is not limited to the non-contact type, and may be a contact type. Hereinafter, an example of a contact type sensor will be described.

The respiration sensor 171 may be a wearable sensor. As the respiration sensor 171, a contact type sensor of various modes such as a band type, a jacket type, and a mask type may be used.

In a case where a band-type sensor is used as the respiration sensor 171, the information processing system 1 acquires a displacement amount of the respiration from expansion and contraction of a band wound around the chest or abdomen of the user. In a case where a jacket type sensor is used as the respiration sensor 171, the information processing system 1 embeds a band in a jacket worn by the user. Furthermore, it is possible to improve the accuracy of the respiration detection by providing sensors at a plurality of positions (directions).

Furthermore, in a case where an acceleration sensor is used as the respiration sensor 171, the information processing system 1 may observe the movement of the chest by an acceleration sensor mounted on a wearable device such as a neck hanging device or a smartphone worn on the upper body of the user to estimate the respiration amount. Furthermore, in a case where a mask-type sensor is used as the respiration sensor 171, the information processing system 1 detects the speeds of exhalation and inspiration by an air volume sensor or an atmospheric pressure sensor mounted on the mask, and estimates a depth and a cycle from the accumulated displacement amount.

Furthermore, a virtual reality (VR) headset that covers the mouth of the user may be used as the respiration sensor 171. In this case, since VR is being used, a disadvantage in the real world can be ignored by the respiration sensor 171 that performs respiration sensing with a noise cut-off microphone. Furthermore, in a case where a proximity microphone is used for the respiration sensor 171, the information processing system 1 recognizes the sound of the breath discharged by the proximity microphone, recognizes a temporal change amount of the exhalation, and estimates the depth and speed of the respiration. For example, the information processing system 1 recognizes the sound of noise generated when the microphone is hit by the breath discharged by the proximity microphone, recognizes the temporal change amount of the exhalation, and estimates the depth and speed of the respiration.

1-1-2-2. Non-Contact Type

Furthermore, the non-contact sensor is not limited to the millimeter wave radar, and various non-contact sensors may be used as the respiration sensor 171. Hereinafter, examples of non-contact sensors other than the millimeter wave radar will be described.

As the respiration sensor 171, a method of image sensing, a method of respiration detection from the temperature around the nose, a proximity sensor, and a radar other than a millimeter wave radar may be used.

In a case where the image sensing is used for the respiration sensor 171, the information processing system 1 recognizes temporal change amounts of exhalation and inspiration at different temperatures with a thermo camera, and estimates the depth, cycle, and speed of the respiration. Furthermore, the information processing system 1 may perform image sensing on the breath that becomes white in cold weather, recognize the temporal change amount of the exhalation, and estimate the depth, period, and speed of the respiration.

For example, regarding a method of detecting respiration from the temperature around the nose, the following disclosure is disclosed.

Brief respiration sensing method <https://shingi.jst.go.jp/past_abst/abst/p/09/919/tama2.pdf>

For example, regarding the respiration detection using the proximity sensor, the following disclosure is disclosed.

Capacitive film proximity sensor for monitoring movement and respiration of person <https://www.aist.go.jp/aist_j/press release/pr2016/pr20160125/pr20160125.html>

For example, the following disclosure is disclosed regarding respiration detection using a radar.

Heart rate/respiration detection sensor "GZS-350 series" <https://www.ipros.jp/product/detail/2000348329/>

Furthermore, in a case where the millimeter wave radar is used as the respiration sensor 171 as illustrated in FIG. 1, information processing system 1 detects the movement of the chest of the user using the phase difference of the reception signal of the millimeter wave radar, and estimates the respiration amount. For example, the terminal device 10 detects the movement of the chest of the user by the phase difference of the reception signal of the millimeter wave radar using the sensor information detected by the respiration sensor 171, and estimates the respiration amount to generate the inspiration information of the user. Then, the terminal device 10 transmits the generated inspiration information of the user to the server apparatus 100.

Furthermore, the server apparatus 100 may generate the inspiration information of the user. In this case, the terminal device 10 transmits the sensor information detected by respiration sensor 171 to the server apparatus 100. Then, using the sensor information received by the server apparatus 100 that has received the sensor information, the movement of the chest of the user may be detected by the phase difference of the reception signal of the millimeter wave radar, and the respiration amount may be estimated to generate the inspiration information of the user.

Note that the above-described sensor is merely an example of a sensor used for acquiring the inspiration information, and any sensor may be used as long as the sensor can acquire the inspiration information. The information processing system 1 may detect the inspiration information using any sensor as long as the inspiration information indicating the inspiration of the user can be detected.

A sensor unit 17 of the terminal device 10 includes at least one of the above-described sensors, and detects the inspiration information by the sensor. Note that the information processing system 1 may generate the inspiration information using the sensor information detected by the sensor of the sensor unit 17. For example, the terminal device 10 and server apparatus 100 may generate the inspiration information using the sensor information (point cloud data) detected by the respiration sensor 171 (millimeter wave radar). In this case, the terminal device 10 and server apparatus 100 may appropriately use various techniques to generate the inspiration information from the sensor information (point cloud data) detected by the respiration sensor 171 (millimeter wave radar).

1-2. Configuration of Information Processing System According to Embodiment

Figure 5:
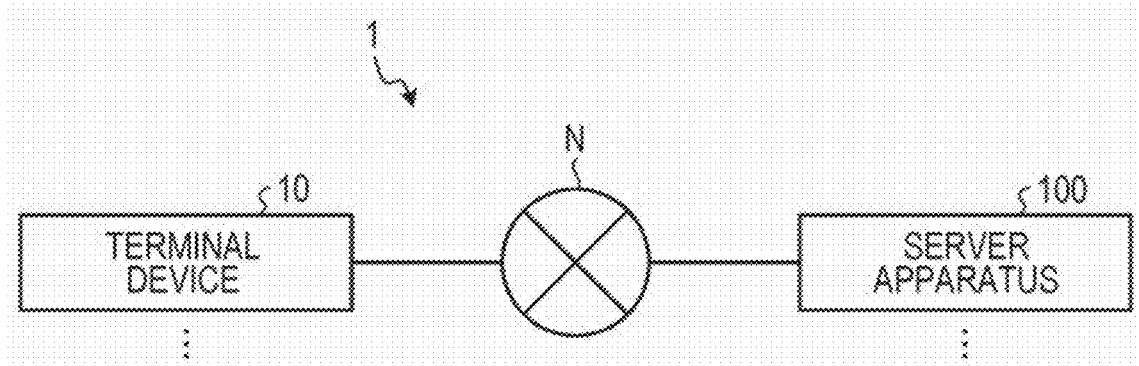
FIG. 5 is a diagram illustrating a configuration example of an information processing system according to one embodiment of the present disclosure.

The information processing system 1 illustrated in FIG. 5 will be described. As illustrated in FIG. 5, the information processing system 1 includes a terminal device 10 and a server apparatus 100. The terminal device 10 and the server apparatus 100 are communicably connected in a wired or wireless manner via a predetermined communication network (network N). FIG. 5 is a diagram illustrating a configuration example of the information processing system according to one embodiment. Note that the information processing system 1 illustrated in FIG. 5 may include a plurality of terminal devices 10 and a plurality of server apparatuses 100.

The server apparatus 100 is a computer that predicts whether or not the user utters after the inspiration of the user on the basis of inspiration information indicating the inspiration of the user. The server apparatus 100 classifies the inspiration of the user on the basis of the inspiration information of the user. Furthermore, the server apparatus 100 is a computer that transmits various types of information to the terminal device 10. The server apparatus 100 is a server apparatus used to provide services regarding various functions.

Furthermore, the server apparatus 100 may include software modules such as voice signal processing, voice recognition, utterance semantic analysis, and interaction control. The server apparatus 100 may have a function of the voice recognition. For example, the server apparatus 100 may have functions of the natural language understanding (NLU) and the automatic speech recognition (ASR). For example, the server apparatus 100 may estimate information regarding the intent and entity (target) of the user from the input information by the utterance of the user. The server apparatus 100 functions as a voice recognition server having a function of the natural language understanding and the automatic voice recognition.

The terminal device 10 is a terminal device that detects the inspiration information indicating the inspiration of the user by a sensor. For example, the terminal device 10 detects the inspiration information indicating the inspiration by the user by the respiration sensor 171. The terminal device 10 is an information processing apparatus that transmits the inspiration information of the user to a server apparatus such as the server apparatus 100. Furthermore, the terminal device 10 may have a function of the voice recognition such as the natural language understanding and automatic voice recognition. For example, the terminal device 10 may estimate information regarding the intent and entity (target) of the user from the input information by the utterance of the user.

The terminal device 10 is a device used by a user. The terminal device 10 receives an input by the user. The terminal device 10 receives a voice input by the utterance of the user or an input by the operation of the user. The terminal device 10 displays information according to the input of the user. The terminal device 10 may be any device as long as the processing in one embodiment can be achieved. The terminal device 10 may be any device as long as the device has a function of detecting the inspiration information of the user and transmitting the inspiration information to the server apparatus 100. For example, the terminal device 10 may be a device such as a smart speaker, a television, a smartphone, a tablet terminal, a notebook personal computer (PC), a desktop PC, a mobile phone, or a personal digital assistant (PDA). The terminal device 10 may be a wearable terminal (Wearable Device) and the like worn by the user. For example, the terminal device 10 may be a wristwatch-type terminal, a glasses-type terminal, and the like.

Figure 6:
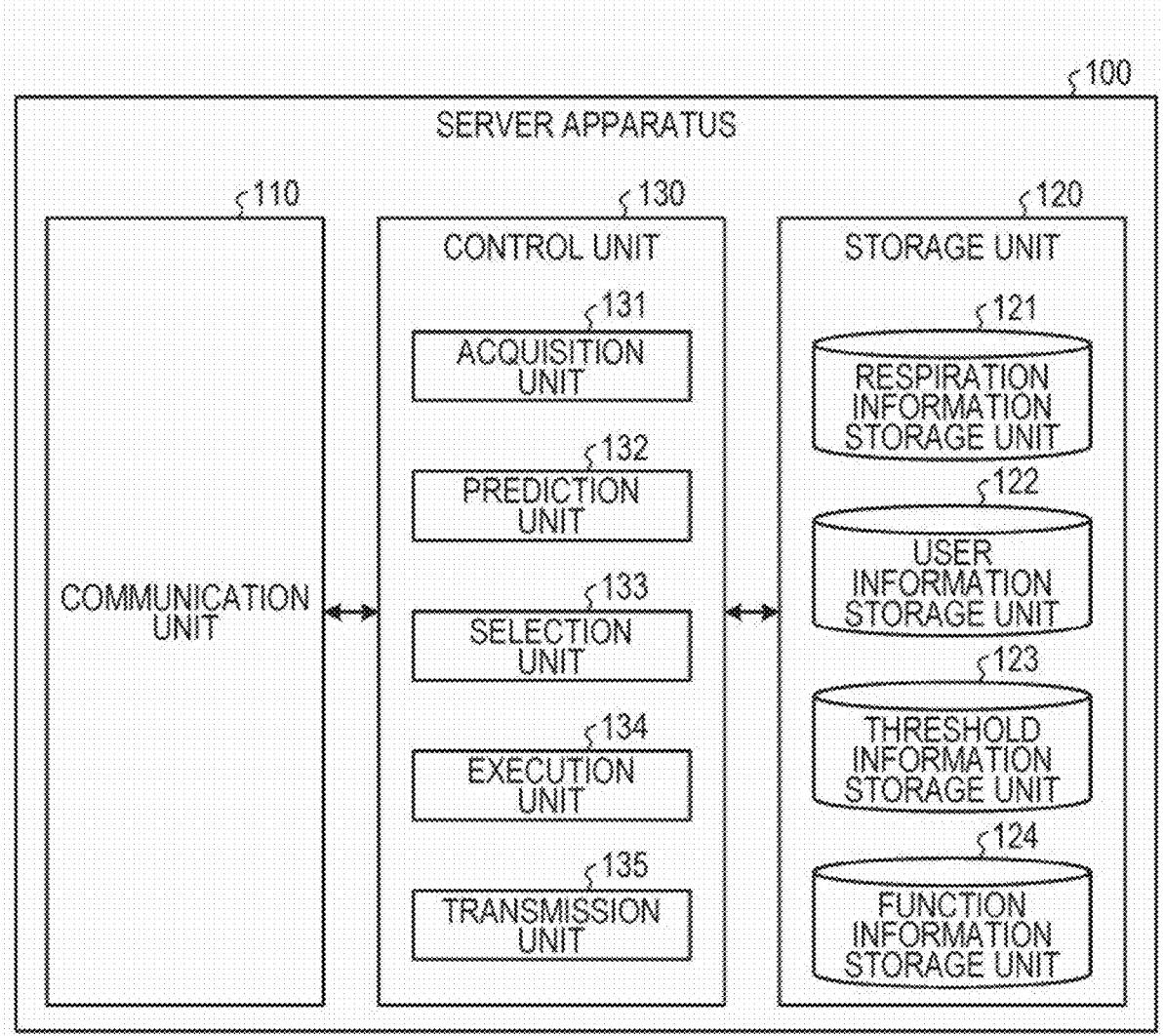
FIG. 6 is a diagram illustrating a configuration example of a server apparatus according to one embodiment of the present disclosure.

1-3. Configuration of Information Processing Apparatus According to Embodiment Next, a configuration of the server apparatus 100, which is an example of an information processing apparatus that executes information processing according to one embodiment, will be described. FIG. 6 is a diagram illustrating a configuration example of the server apparatus 100 according to one embodiment of the present disclosure.

As illustrated in FIG. 6, the server apparatus 100 includes a communication unit 110, a storage unit 120, and a control unit 130. Note that the server apparatus 100 may include an input unit (for example, a keyboard, a mouse, and the like) that receives various operations from an administrator and the like of the server apparatus 100, and a display unit (for example, a liquid crystal display and the like) for displaying various types of information.

The communication unit 110 is achieved by, for example, a network interface card (NIC) and the like. Then, the communication unit 110 is connected to a network N (see FIG. 5) in a wired or wireless manner, and transmits and receives information to and from another information processing apparatus such as the terminal device 10. Furthermore, the communication unit 110 may transmit and receive information to and from a user terminal (not illustrated) used by the user.

The storage unit 120 is achieved by, for example, a semiconductor memory element such as a random access memory (RAM) or a flash memory, or a storage device such as a hard disk or an optical disk. As illustrated in FIG. 6, the storage unit 120 according to one embodiment includes an inspiration information storage unit 121, a user information storage unit 122, a threshold information storage unit 123, and a function information storage unit 124.

The storage unit 120 stores various types of information in addition to the above. The storage unit 120 stores information of a voice recognition application (program) that achieves a voice recognition function. For example, the server apparatus 100 can execute the voice recognition by activating a voice recognition application (also simply referred to as "voice recognition"). The storage unit 120 stores various types of information used for voice recognition. The storage unit 120 stores information of a dictionary (voice recognition dictionary) used for the voice recognition dictionary. The storage unit 120 stores information on a plurality of voice recognition dictionaries. The storage unit 120 stores information such as a long sentence voice recognition dictionary (long sentence dictionary), a middle sentence voice recognition dictionary (middle sentence dictionary), and a short sentence voice recognition dictionary (word/phrase dictionary).

The inspiration information storage unit 121 according to one embodiment stores various types of information regarding the inspiration of the user. The inspiration information storage unit 121 stores various types of information such as the inspiration information of each user in association with identification information (user ID) of each user. The inspiration information storage unit 121 stores the inspiration information including the increase amount of the inspiration of the user. The inspiration information storage unit 121 stores the inspiration information including the inspiration amount of the inspiration of the user. The inspiration information storage unit 121 stores the inspiration information including the initial inspiration amount at the start time point of the inspiration of the user. The inspiration information storage unit 121 stores the inspiration information including the maximum inspiration amount of the user. The inspiration information storage unit 121 stores time point information indicating the utterance start time point after the user performs inspiration. The inspiration information storage unit 121 stores the utterance information including the length and the number of characters of the utterance after the user performs inspiration.

Note that the inspiration information storage unit 121 is not limited to the above, and may store various types of information according to the purpose. For example, the inspiration information storage unit 121 may store not only the inspiration information but also information regarding the respiration of the user. The inspiration information storage unit 121 may store information regarding the inspiration of the user. For example, the inspiration information storage unit 121 may store various types of information necessary for generating the graphs GR1 to GR5. For example, the inspiration information storage unit 121 may store various types of information illustrated in the graphs GR1 to GR5.

The user information storage unit 122 according to one embodiment stores various types of information regarding the user. For example, the user information storage unit 122 stores various types of information such as attribute information of each user.

The user information storage unit 122 stores information regarding the user such as a user ID, an age, a gender, and a residential place. For example, the user information storage unit 122 stores information related to the user U1 such as the age, gender, and residential place of the user U1 associated with a user ID "U1" for identifying the user U1.

Furthermore, the user information storage unit 122 stores information for identifying a device (a television, a smartphone, and the like) used by each user in association with the user. The user information storage unit 122 stores information (terminal ID and the like) for identifying the terminal device 10 used by each user in association with the user.

Note that the user information storage unit 122 is not limited to the above, and may store various types of information according to the purpose. For example, the user information storage unit 122 may store not only age and gender but also other demographic attribute information and psychographic attribute information. For example, the user information storage unit 122 may store information such as a name, a home, a work place, an interest, a family structure, a revenue, and a lifestyle.

The threshold information storage unit 123 according to one embodiment stores various types of information regarding the threshold. The threshold information storage unit 123 stores various types of information regarding a threshold used for prediction processing and classification processing. FIG. 7 is a diagram illustrating an example of a threshold information storage unit according to one embodiment; The threshold information storage unit 123 illustrated in FIG. 7 includes items such as "threshold ID", "use", "threshold name", and "value".

The "threshold ID" indicates identification information for identifying the threshold. The "use" indicates an application of the threshold. The "threshold name" indicates a name (character string) of a threshold (variable) used as a threshold identified by the corresponding threshold ID. The "value" indicates a specific value of the threshold identified by the corresponding threshold ID.

In the example of FIG. 7, it is indicated that the use of the threshold (threshold TH1) identified by the threshold ID "TH1" is the utterance presence/absence prediction. The threshold TH1 indicates that it is used as a threshold name "Threshold_uttr_pr". The value of the threshold TH1 indicates "VL1". Note that, in FIG. 7, the value is indicated by an abstract code such as "VL1", but the value is a specific numerical value such as "0.5" or "1.8".

Note that, although FIG. 7 illustrates only the threshold TH1 used for the utterance presence/absence prediction, the threshold information storage unit 123 also stores various thresholds used for the classification processing. For example, the threshold information storage unit 123 stores various thresholds corresponding to Threshold_uttr, Threshold_ask, and the like illustrated in FIG. 13. Furthermore, the threshold information storage unit 123 is not limited to the above, and may store various types of information according to the purpose.

The function information storage unit 124 according to one embodiment stores various types of information regarding functions. The function information storage unit 124 stores information regarding each function executed in response to the input of the user. The function information storage unit 124 stores information regarding an input necessary for execution of a function. The function information storage unit 124 stores input items necessary for execution of each function. Note that the function information storage unit 124 is not limited to the above, and may store various types of information depending on the purpose.

Returning to FIG. 6, the description will be continued. The control unit 130 is implemented by, for example, a central processing unit (CPU), a micro processing unit (MPU), and the like executing a program (for example, an information processing program and the like according to the present disclosure) stored inside the server apparatus 100 using a random access memory (RAM) and the like as a work area. Furthermore, the control unit 130 is achieved by, for example, an integrated circuit such as an application specific integrated circuit (ASIC) or a field programmable gate array (FPGA).

As illustrated in FIG. 6, the control unit 130 includes an acquisition unit 131, a prediction unit 132, a selection unit 133, an execution unit 134, and a transmission unit 135, and implements or executes a function and an action of information processing described below. Note that the internal configuration of the control unit 130 is not limited to the configuration illustrated in FIG. 6, and may be another configuration as long as information processing to be described later is performed. Furthermore, a connection relationship among the processing units included in the control unit 130 is not limited to the connection relationship illustrated in FIG. 6, and may be another connection relationship.

The acquisition unit 131 acquires various types of information. The acquisition unit 131 acquires various types of information from an external information processing apparatus. The acquisition unit 131 acquires various types of information from the terminal device 10. The acquisition unit 131 acquires various types of information detected by the sensor unit 17 of the terminal device 10 from the terminal device 10. The acquisition unit 131 acquires the information detected by the respiration sensor 171 of the sensor unit 17 from the terminal device 10.

The acquisition unit 131 acquires various types of information from the storage unit 120. The acquisition unit 131 acquires various types of information from the inspiration information storage unit 121, the user information storage unit 122, the threshold information storage unit 123, and the function information storage unit 124. The acquisition unit 131 acquires various types of information predicted by the prediction unit 132. The acquisition unit 131 acquires various types of information selected by the selection unit 133.

The acquisition unit 131 acquires the inspiration information indicating the inspiration of the user. The acquisition unit 131 acquires the inspiration information including the increase amount of the inspiration of the user. The acquisition unit 131 acquires the inspiration information including the inspiration amount of the user. The acquisition unit 131 acquires the inspiration information including the initial inspiration amount of the user at the start time point of the inspiration. The acquisition unit 131 acquires inspiration information including the maximum inspiration amount of the user. The acquisition unit 131 acquires time point information indicating the utterance start time point after the user performs inspiration. The acquisition unit 131 acquires the utterance information including the length and the number of characters of the utterance after the user performs the inspiration. For example, the acquisition unit 131 acquires the inspiration information BINF1 indicating the inspiration of the user U1.

The prediction unit 132 predicts various types of information. The prediction unit 132 classifies various types of information. The prediction unit 132 calculates various types of information. The prediction unit 132 determines various types of information. The prediction unit 132 makes various determinations. The prediction unit 132 determines various types of information. For example, the prediction unit 132 predicts various types of information on the basis of information from an external information processing apparatus or information stored in the storage unit 120. The prediction unit 132 predicts various types of information on the basis of information from another information processing apparatus such as the terminal device 10. The prediction unit 132 predicts various types of information on the basis of information stored in the inspiration information storage unit 121, the user information storage unit 122, the threshold information storage unit 123, or the function information storage unit 124. The prediction unit 132 classifies various types of information. For example, the prediction unit 132 classifies various types of information on the basis of information from an external information processing apparatus or information stored in the storage unit 120.

The prediction unit 132 predicts various types of information on the basis of the various types of information acquired by the acquisition unit 131. The prediction unit 132 predicts various types of information on the basis of the various types of information selected by the selection unit 133. The prediction unit 132 makes various determinations on the basis of the prediction. Various determinations are made on the basis of the information acquired by the acquisition unit 131. The prediction unit 132 calculates a score on the basis of the inspiration information. The prediction unit 132 calculates a score used for utterance prediction of the user on the basis of the inspiration information.

The prediction unit 132 predicts whether or not the user utters after the inspiration of the user on the basis of the inspiration information acquired by the acquisition unit 131. The prediction unit 132 predicts, on the basis of the increase amount, whether or not the user utters after the inspiration. The prediction unit 132 predicts whether or not the user utters after the inspiration on the basis of the inspiration amount, and the prediction unit 132 predicts whether or not the user utters after the inspiration on the basis of the initial inspiration amount.

The prediction unit 132 calculates the score using the inspiration information and a predetermined formula. The prediction unit 132 predicts whether or not the user utters after the inspiration using the score calculated on the basis of the inspiration information. The prediction unit 132 compares the score with the threshold, and predicts whether or not the user utters after the inspiration, after the inspiration on the basis of the comparison result. In a case where the comparison result between the score and the threshold satisfies a predetermined condition, the prediction unit 132 predicts that the user utters after the inspiration. In a case where the score is larger than the threshold, the prediction unit 132 predicts that the user utters after the inspiration. For example, the prediction unit 132 calculates the utterance prediction score "Score_uttr_pr", which is a score used for utterance prediction, using the current inspiration amount "B_current", the increase amount "B_increase", and Formula (1). For example, in a case where the utterance prediction score "Score_uttr_pr" is larger than the utterance presence/absence prediction threshold "Threshold_uttr_pr", the prediction unit 132 predicts that the user U1 utters. For example, in a case where the utterance prediction score "Score_uttr_pr" is equal to or less than the utterance presence/absence prediction threshold "Threshold_uttr_pr", the prediction unit 132 predicts that the user U1 does not utter.

The prediction unit 132 classifies the inspiration of the user on the basis of the inspiration information. The prediction unit 132 classifies the inspiration of the user on the basis of the maximum inspiration amount. The prediction unit 132 classifies the inspiration of the user on the basis of the interval between the time point of the maximum inspiration amount and the utterance start time point. The prediction unit 132 classifies the inspiration of the user on the basis of the length and the number of characters of the utterance.

The prediction unit 132 classifies the inspiration of the user into any of a plurality of types including at least request type inspiration and non-request type inspiration. The prediction unit 132 classifies the inspiration of the user into any of a plurality of types including at least long sentence type inspiration and short sentence type inspiration. The prediction unit 132 classifies the inspiration of the user into any of a plurality of types including at least normal processing requesting inspiration and shortened processing requesting inspiration.

The selection unit 133 selects various types of information. The selection unit 133 extracts various types of information. The selection unit 133 specifies various types of information. The selection unit 133 selects various types of information on the basis of information from an external information processing apparatus or information stored in the storage unit 120. The selection unit 133 selects various types of information on the basis of information from another information processing apparatus such as the terminal device 10. The selection unit 133 selects various types of information on the basis of information stored in the inspiration information storage unit 121, the user information storage unit 122, the threshold information storage unit 123, or the function information storage unit 124.

The selection unit 133 selects various types of information on the basis of the various types of information acquired by the acquisition unit 131. The selection unit 133 selects various types of information on the basis of various types of information predicted by the prediction unit 132. The selection unit 133 selects various types of information on the basis of the processing executed by the execution unit 134.

The selection unit 133 performs selection processing according to a classification result by the prediction unit 132. The selection unit 133 selects processing to be executed according to a classification result by the prediction unit 132. The selection unit 133 selects information to be used for processing of the utterance of the user according to the classification result by the prediction unit 132.

The execution unit 134 executes various types of processing. The execution unit 134 determines execution of various types of processing. The execution unit 134 executes various types of processing on the basis of information from an external information processing apparatus. The execution unit 134 executes various types of processing on the basis of the information stored in the storage unit 120. The execution unit 134 executes various types of processing on the basis of information stored in the inspiration information storage unit 121, the user information storage unit 122, the threshold information storage unit 123, or the function information storage unit 124.

The execution unit 134 executes various types of processing on the basis of the various types of information acquired by the acquisition unit 131. The execution unit 134 executes various types of processing on the basis of various types of information predicted by the prediction unit 132. The execution unit 134 executes various types of processing on the basis of various types of information selected by the selection unit 133.

The execution unit 134 generates various types of information. The execution unit 134 generates various types of information on the basis of information from an external information processing apparatus or information stored in the storage unit 120. The execution unit 134 generates various types of information on the basis of information from another information processing apparatus such as the terminal device 10. The execution unit 134 generates various types of information on the basis of information stored in the inspiration information storage unit 121, the user information storage unit 122, the threshold information storage unit 123, or the function information storage unit 124.

The execution unit 134 executes processing according to a prediction result by the prediction unit 132. In a case where the prediction unit 132 predicts that the user utters after the inspiration, the execution unit 134 executes pre-processing regarding the voice recognition. The execution unit 134 executes pre-processing before the user finishes the inspiration.

In a case where the prediction unit 132 has predicted that the user utters after the inspiration, the execution unit 134 executes the activation of the voice recognition. In a case where the prediction unit 132 predicts that the user utters after the inspiration, the execution unit 134 executes pre-processing for activating voice recognition before the inspiration of the user ends. For example, in a case where it is predicted that the user U1 utters, the execution unit 134 determines that there is a high possibility that an utterance will be made after the current inspiration, and executes pre-processing necessary for voice recognition.

In a case where the prediction unit 132 predicts that the user utters after the inspiration, the execution unit 134 executes pre-processing of instructing the terminal device 10 to start voice recognition. In a case where the prediction unit 132 predicts that the user utters after the inspiration, the execution unit 134 executes pre-processing of instructing the terminal device 10 to start voice recognition before the inspiration of the user ends.

The transmission unit 135 transmits various types of information. The transmission unit 135 transmits various types of information to an external information processing apparatus. The transmission unit 135 provides various types of information to an external information processing apparatus. For example, the transmission unit 135 transmits various types of information to another information processing apparatus such as the terminal device 10. The transmission unit 135 provides the information stored in the storage unit 120. The transmission unit 135 transmits the information stored in the storage unit 120.

The transmission unit 135 provides various types of information on the basis of information from another information processing apparatus such as the terminal device 10.

The transmission unit 135 provides various types of information on the basis of the information stored in the storage unit 120. The transmission unit 135 provides various types of information on the basis of information stored in the inspiration information storage unit 121, the user information storage unit 122, the threshold information storage unit 123, or the function information storage unit 124.

The transmission unit 135 transmits information indicating a function to be executed by the terminal device 10 to the terminal device 10. The transmission unit 135 transmits, to the terminal device 10, information indicating the function determined to be executed by the execution unit 134. The transmission unit 135 transmits various types of information to the terminal device 10 in response to an instruction from the execution unit 134. The transmission unit 135 transmits information instructing the terminal device 10 to activate the voice recognition application. In a case where the prediction unit 132 predicts that the user utters after the inspiration, the transmission unit 135 transmits information instructing the terminal device 10 to start the voice recognition. In a case where the prediction unit 132 predicts that the user utters after the inspiration, the transmission unit 135 transmits information instructing the terminal device 10 to start the voice recognition before the user finishes the inspiration.

1-4. Configuration of Terminal Device According to Embodiment

Next, a configuration of the terminal device 10 which is an example of the information processing apparatus that executes the information processing according to one embodiment will be described. FIG. 8 is a diagram illustrating a configuration example of a terminal device according to one embodiment of the present disclosure.

As illustrated in FIG. 8, the terminal device 10 includes a communication unit 11, an input unit 12, an output unit 13, a storage unit 14, a control unit 15, a display unit 16, a sensor unit 17, and a light source unit 18.

The communication unit 11 is achieved by, for example, an NIC, a communication circuit, and the like. The communication unit 11 is connected to a network N (the Internet and the like) in a wired or wireless manner, and transmits and receives information to and from other devices such as the server apparatus 100 via the network N.

The input unit 12 receives various inputs. The input unit 12 receives detection by the sensor unit 17 as an input. The input unit 12 receives an input of the inspiration information indicating inspiration of the user. The input unit 12 receives the input of the inspiration information detected by the sensor unit 17. The input unit 12 receives the input of the inspiration information detected by the respiration sensor 171. The input unit 12 receives the input of the inspiration information on the basis of the point cloud data detected by the respiration sensor 171. The input unit 12 receives an input of the utterance information of the user. The input unit 12 receives the input of the inspiration information of the user who performs an input by a body motion. The input unit 12 receives a gesture or a line-of-sight of the user as an input.

Various operations are input from the user to the input unit 12. The input unit 12 receives a sound as an input by the sensor unit 17 having a function of detecting a sound. The input unit 12 receives, as input information, voice information detected by a microphone (sound sensor) that detects a voice. The input unit 12 receives a voice by the utterance of the user as the input information.

Furthermore, the input unit 12 may receive an operation (user operation) on the terminal device 10 used by the user as an operation input by the user. The input unit 12 may receive information regarding the operation of the user using a remote controller (remote controller) via the communication unit 11. Furthermore, the input unit 12 may include a button provided on the terminal device 10, or a keyboard or a mouse connected to the terminal device 10.

For example, the input unit 12 may have a touch panel capable of realizing functions equivalent to those of a remote controller, a keyboard, and a mouse. In this case, various types of information are input to the input unit 12 via the display unit 16. The input unit 12 receives various operations from the user via the display screen by a function of a touch panel achieved by various sensors. That is, the input unit 12 receives various operations from the user via the display unit 16 of the terminal device 10. For example, the input unit 12 receives an operation such as a designation operation by the user via the display unit 16 of the terminal device 10. For example, the input unit 12 functions as an acceptance unit that receives the operation of the user by the function of the touch panel. In this case, the input unit 12 and the acceptance unit 153 may be integrated. Note that, as a method of detecting the operation of the user by the input unit 12, a capacitance method is mainly adopted in the tablet terminal, but any method may be adopted as long as the operation of the user can be detected and the function of the touch panel can be achieved, such as a resistive film method, a surface acoustic wave method, an infrared method, and an electromagnetic induction method, which are other detection methods.

For example, the input unit 12 receives the utterance of the user U1 as an input. The input unit 12 receives the utterance of the user U1 detected by the sensor unit 17 as an input. The input unit 12 receives, as an input, the utterance of the user U1 detected by the sound sensor of the sensor unit 17.

The output unit 13 outputs various types of information. The output unit 13 has a function of outputting sound. For example, the output unit 13 includes a speaker that outputs sound. The output unit 13 outputs various types of information by voice according to the control by the execution unit 152. The output unit 13 outputs information by voice to the user. The output unit 13 outputs the information displayed on the display unit 16 by voice.

The storage unit 14 is achieved by, for example, a semiconductor memory element such as a RAM or a flash memory, or a storage device such as a hard disk or an optical disk. The storage unit 14 stores information of a voice recognition application (program) that achieves a voice recognition function. For example, the terminal device 10 can execute voice recognition by activating the voice recognition application. The storage unit 14 stores various types of information used for displaying information. The storage unit 14 stores various types of information used for voice recognition. The storage unit 14 stores information of a dictionary (voice recognition dictionary) used for the voice recognition dictionary.

Returning to FIG. 8, the description will be continued. The control unit 15 is implemented by, for example, a CPU, an MPU, and the like executing a program (for example, an information processing program according to the present disclosure) stored inside the terminal device 10 using a RAM and the like as a work area. Furthermore, the control unit 15 may be achieved by, for example, an integrated circuit such as an ASIC or an FPGA.

As illustrated in FIG. 8, the control unit 15 includes a reception unit 151, an execution unit 152, an acceptance unit 153, and a transmission unit 154, and achieves or executes a function and an action of information processing described below. Note that the internal configuration of the control unit 15 is not limited to the configuration illustrated in FIG. 8, and may be another configuration as long as information processing to be described later is performed.

The reception unit 151 receives various types of information. The reception unit 151 receives various types of information from an external information processing apparatus. The reception unit 151 receives various types of information from another information processing apparatus such as the server apparatus 100.

The reception unit 151 receives information instructing the activation of the voice recognition from server apparatus 100. The reception unit 151 receives information instructing the activation of the voice recognition application from the server apparatus 100.

The reception unit 151 receives execution instructions of various functions from the server apparatus 100. For example, the reception unit 151 receives information designating a function from the server apparatus 100 as a function execution instruction. The reception unit 151 receives a content. The reception unit 151 receives a content to be displayed from the server apparatus 100.

The execution unit 152 executes various types of processing. The execution unit 152 determines execution of various types of processing. The execution unit 152 executes various types of processing on the basis of information from an external information processing apparatus. The execution unit 152 executes various types of processing on the basis of the information from the server apparatus 100. The execution unit 152 executes various types of processing in accordance with the instruction from the server apparatus 100. The execution unit 152 executes various types of processing on the basis of the information stored in the storage unit 14. The execution unit 152 activates voice recognition.

The execution unit 152 controls various outputs. The execution unit 152 controls voice output by the output unit 13. The execution unit 152 controls lighting of the light source unit 18. The execution unit 152 controls various displays. The execution unit 152 controls display on the display unit 16. The execution unit 152 controls display on the display unit 16 in response to reception by the reception unit 151. The execution unit 152 controls display on the display unit 16 on the basis of the information received by the reception unit 151. The execution unit 152 controls the display of the display unit 16 on the basis of the information received by the acceptance unit 153. The execution unit 152 controls display on the display unit 16 according to reception by the acceptance unit 153.

The acceptance unit 153 receives various types of information. The acceptance unit 153 receives an input by the user via the input unit 12. The acceptance unit 153 receives an utterance by the user as an input. The acceptance unit 153 receives an operation by the user. The acceptance unit 153 receives the operation of the user on the information displayed by the display unit 16. The acceptance unit 153 receives character input by the user.

The transmission unit 154 transmits various types of information to an external information processing apparatus. For example, the transmission unit 154 transmits various types of information to another information processing apparatus such as the terminal device 10. The transmission unit 154 transmits the information stored in the storage unit 14.

The transmission unit 154 transmits various types of information on the basis of information from another information processing apparatus such as the server apparatus 100. The transmission unit 154 transmits various types of information on the basis of the information stored in the storage unit 14.

The transmission unit 154 transmits the sensor information detected by the sensor unit 17 to the server apparatus 100. The transmission unit 154 transmits the inspiration information of the user U1 detected by the respiration sensor 171 of the sensor unit 17 to the server apparatus 100.

The transmission unit 154 transmits the input information input by the user to the server apparatus 100. The transmission unit 154 transmits the input information into which the voice of the user is input to the server apparatus 100. The transmission unit 154 transmits the input information input by the operation of the user to the server apparatus 100.

The transmission unit 154 transmits the inspiration information indicating the inspiration of the user to the server apparatus 100. The transmission unit 154 transmits the inspiration information including the increase amount of the inspiration of the user to the server apparatus 100. The transmission unit 154 transmits the inspiration information including the inspiration amount of the user to the server apparatus 100. The transmission unit 154 transmits, to the server apparatus 100, the inspiration information including an initial inspiration amount at the start time point of the inspiration of the user. The transmission unit 154 transmits the inspiration information including the maximum inspiration amount of the user to the server apparatus 100. The transmission unit 154 transmits, to the server apparatus 100, the time point information indicating the utterance start time point after the user performs the inspiration. The transmission unit 154 transmits the utterance information including the length and the number of characters of the utterance after the inspiration of the user to the server apparatus 100.

The display unit 16 is provided in the terminal device 10 and displays various types of information. The display unit 16 is achieved by, for example, a liquid crystal display, an organic electro-luminescence (EL) display, and the like. The display unit 16 may be achieved by any means as long as the information provided from the server apparatus 100 can be displayed. The display unit 16 displays various types of information under the control of the execution unit 152.

The display unit 16 displays the content. The display unit 16 displays the content received by the reception unit 151.

The sensor unit 17 detects predetermined information. The sensor unit 17 detects the inspiration information of the user. The sensor unit 17 includes the respiration sensor 171 as means for detecting the inspiration information indicating the inspiration of the user. The sensor unit 17 detects inspiration information by the respiration sensor 171.

The sensor unit 17 detects inspiration information by the respiration sensor 171. The sensor unit 17 detects the inspiration information by respiration sensor 171 using a millimeter wave radar. Furthermore, the sensor unit 17 is not limited to the millimeter wave radar, and may include the respiration sensor 171 having any configuration as long as it can detect inspiration information of the user. The respiration sensor 171 may be an image sensor. The respiration sensor 171 may be a wearable sensor. As the respiration sensor 171, either a contact type sensor or a non-contact type sensor may be used.

Furthermore, the sensor unit 17 is not limited to the above, and may include various sensors. The sensor unit 17 may include a sensor (position sensor) that detects position information, such as a global positioning system (GPS) sensor. Note that the sensor unit 17 is not limited to the above, and may include various sensors.

The light source unit 18 includes a light source such as a light emitting diode (LED). The light source unit 18 emits light. The light source unit 18 achieves a desired lighting mode. The light source unit 18 achieves a desired lighting mode according to the control by the execution unit 152. The light source unit 18 is turned on under the control of the execution unit 152. The light source unit 18 is turned off according to the control by the execution unit 152. The light source unit 18 blinks according to the control by the execution unit 152.

1-5. Procedure of Information Processing According to Embodiment

Next, a procedure of various types of information processing according to one embodiment will be described with reference to FIGS. 9 and 10.

1-5-1. Procedure of Processing According to Information Processing Apparatus First, a flow of processing according to the information processing apparatus according to one embodiment of the present disclosure will be described with reference to FIG. 9. FIG. 9 is a flowchart illustrating a processing procedure of the information processing apparatus according to one embodiment of the present disclosure. Specifically, FIG. 9 is a flowchart illustrating a procedure of information processing by the server apparatus 100.

Figure 9:
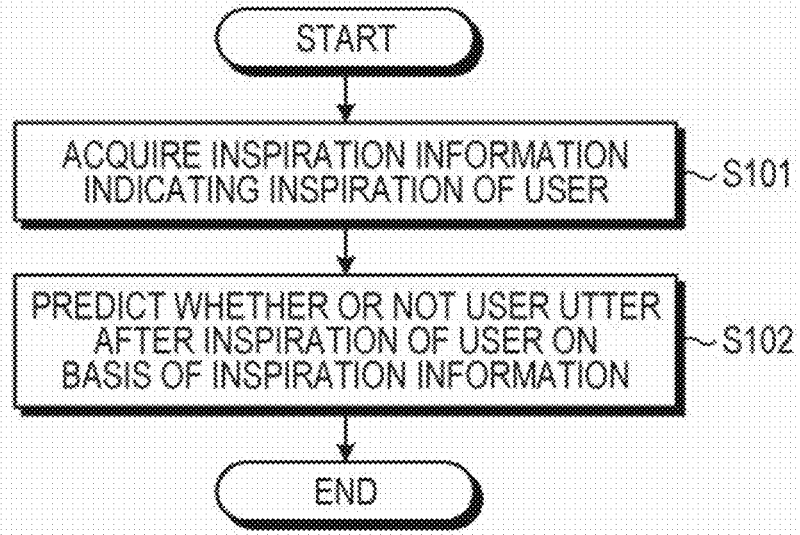
FIG. 9 is a flowchart illustrating a processing procedure of the information processing apparatus according to one embodiment of the present disclosure.

As illustrated in FIG. 9, the server apparatus 100 acquires the inspiration information indicating the inspiration of the user (Step S101). Then, the server apparatus 100 predicts whether or not the user utters after the inspiration of the user on the basis of the inspiration information (Step S102).

1-5-2. Procedure of Processing According to Information Processing System

Next, a flow of processing according to the information processing system according to one embodiment of the present disclosure will be described with reference to FIG. 10. FIG. 10 is a sequence diagram illustrating a processing procedure of the information processing system according to one embodiment of the present disclosure.

Figure 10:
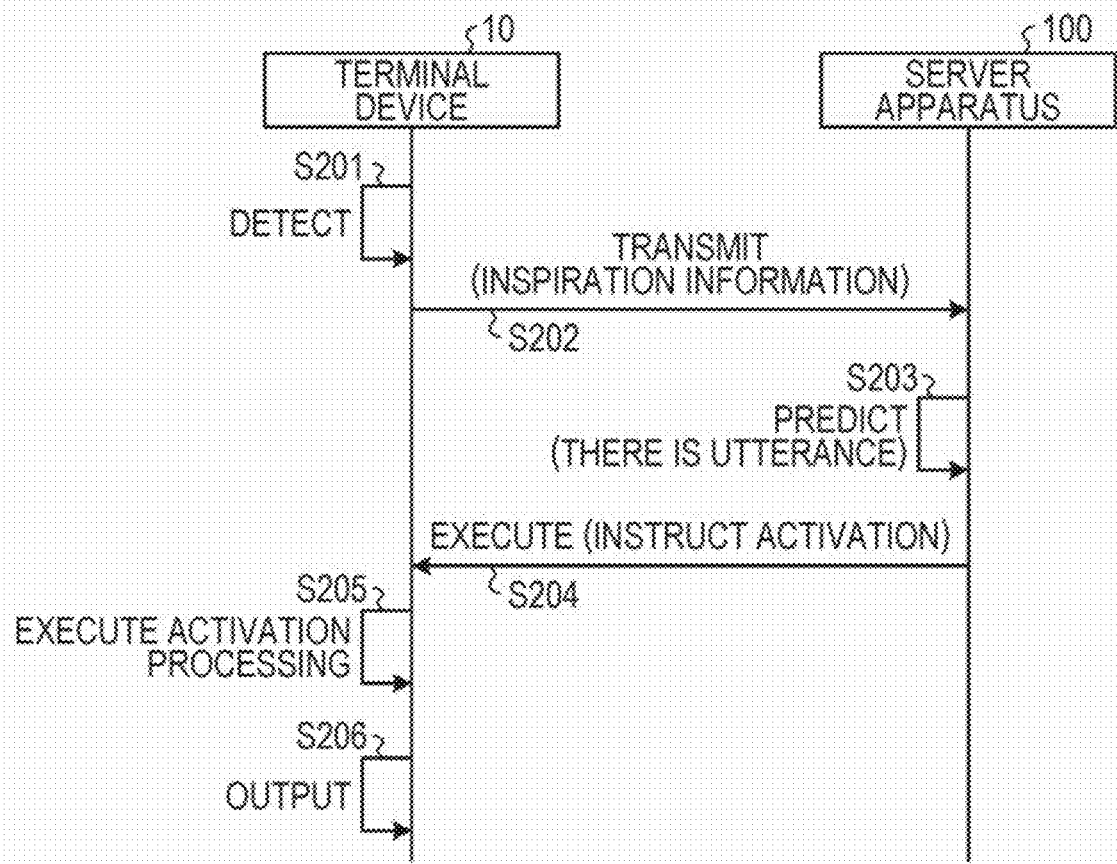
FIG. 10 is a sequence diagram illustrating the processing procedure of the information processing system according to one embodiment of the present disclosure.

As illustrated in FIG. 10, the terminal device 10 detects the inspiration information indicating the inspiration of the user (Step S201). For example, the terminal device 10 acquires the inspiration information of the user detected by the respiration sensor 171. Then, the terminal device 10 transmits the inspiration information indicating the inspiration of the user to the server apparatus 100 (Step S202).

The server apparatus 100 predicts whether or not the user utters after the inspiration of the user on the basis of the inspiration information acquired from the terminal device 10 (Step S203). In the example of FIG. 10, the server apparatus 100 predicts that the user utters after the inspiration of the user on the basis of the inspiration information acquired from the terminal device 10.

Then, since it is predicted that the user utters, the server apparatus 100 executes the voice recognition activation instruction to the terminal device 10 (Step S204). The server apparatus 100 instructs terminal device 10 to execute the activation of the voice recognition by transmitting the information instructing the activation of the voice recognition to the terminal device 10. Then, the terminal device 10 executes the voice recognition activation processing in response to an instruction from the server apparatus 100 (Step S205). Then, the terminal device 10 outputs the voice corresponding to the activation of the voice recognition (Step S206). The terminal device 10 outputs the voice corresponding to the activation of the voice recognition or emits light. For example, the terminal device 10 audio-outputs, by the output unit 13, WakeUpResponse (activation notification) corresponding to the activation of the voice recognition. Furthermore, for example, the terminal device 10 causes the light source unit 18 to execute a point and the like corresponding to the activation of the voice recognition.

1-6. Processing Example Using Classification Result

The server apparatus 100 is not limited to the prediction processing described above, and may perform various types of processing. For example, the server apparatus 100 may perform classification processing of classifying the inspiration of the user. This point will be described below. Note that, in the following description, description of points similar to those in FIG. 1 will be omitted as appropriate.

1-6-1. Example of Omission of Activation Word by Respiration State

Figure 11:
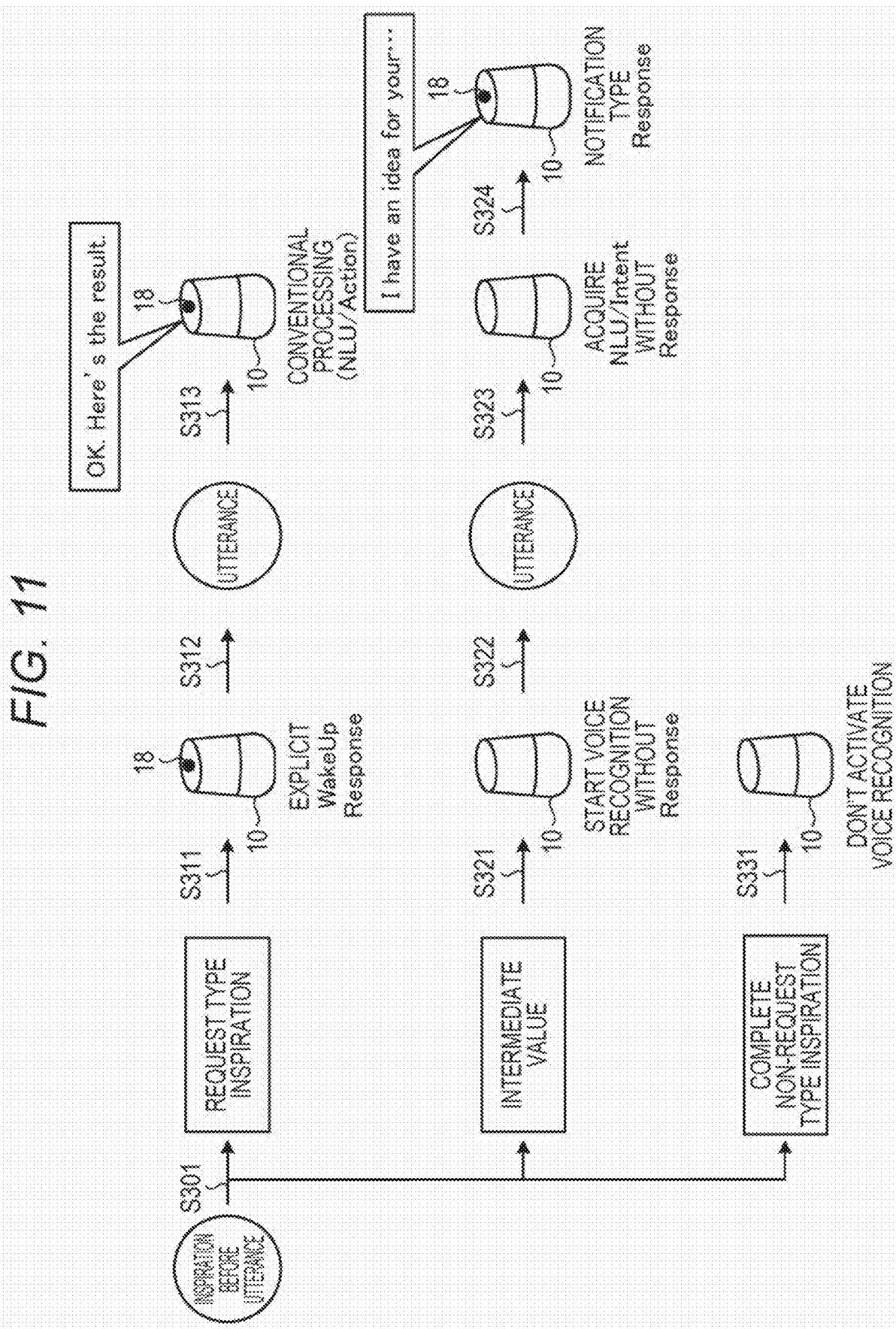
FIG. 11 is a diagram illustrating an example of processing using a classification result of inspiration.

An example of the classification processing will be described with reference to FIG. 11. FIG. 11 is a diagram illustrating an example of processing using the classification result of the inspiration. FIG. 11 illustrates an example of an abbreviation of the activation word according to the respiration state.

First, in the example of FIG. 11, the server apparatus 100 acquires the inspiration information indicating the inspiration before the utterance of the user U1. For example, the server apparatus 100 acquires the inspiration information indicating the inspiration of the user U1 from the terminal device 10 used by the user U1.

The server apparatus 100 performs the classification processing using the inspiration information indicating the inspiration of user U1 (Step S301). The server apparatus 100 calculates the score using the inspiration information. Then, the server apparatus 100 classifies the inspiration of the user U1 by comparing the calculated score with the threshold. The server apparatus 100 classifies the inspiration of the user U1 on the basis of a magnitude relationship between the calculated score and each threshold.

Figure 12:
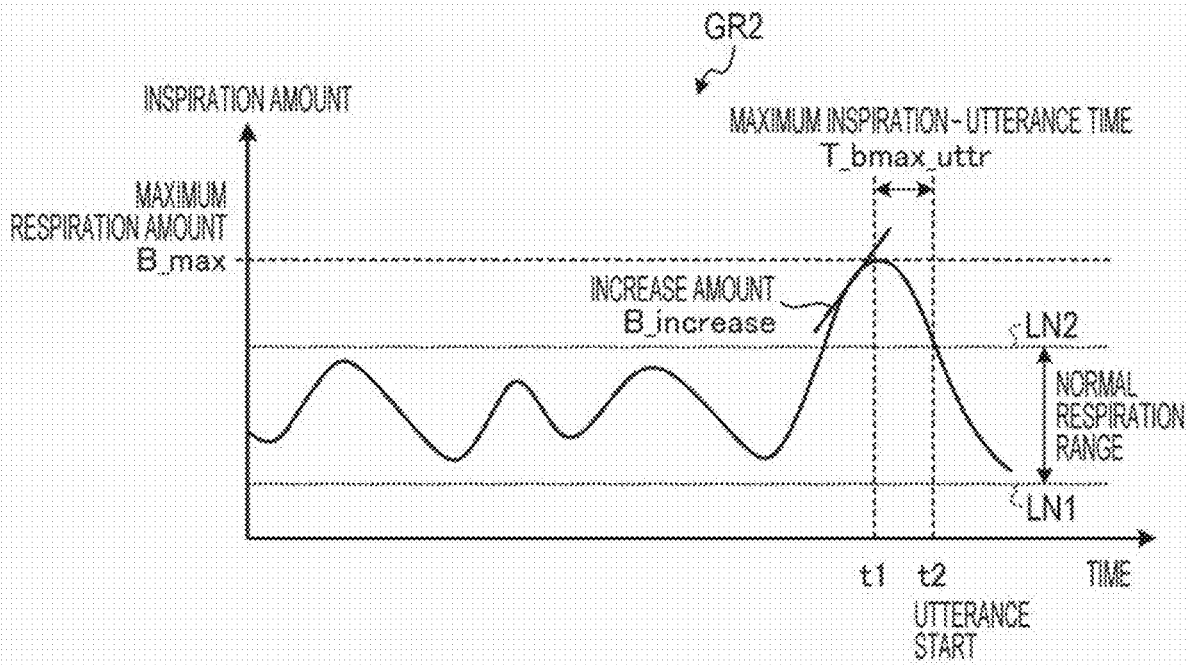
FIG. 12 is a diagram illustrating an example of the inspiration information of the user.
Figure 13:
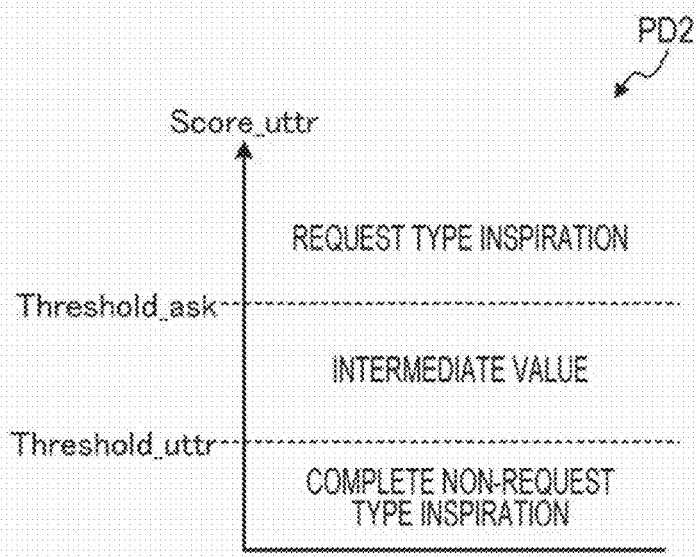
FIG. 13 is a diagram illustrating an example of the prediction using the inspiration of the user.

Hereinafter, the above-described classification processing performed by the server apparatus 100 will be specifically described with reference to FIGS. 12 and 13. FIG. 12 is a diagram illustrating an example of the inspiration information of the user. FIG. 13 is a diagram illustrating an example of the prediction using the inspiration of the user.

A graph GR2 in FIG. 12 is a graph illustrating a relationship between a time and the inspiration amount, where a horizontal axis represents time and a vertical axis represents the inspiration amount. Note that, in the graph GR2, descriptions of points similar to those of the graph GR1 in FIG. 2 will be omitted.

For example, the maximum respiration amount "B_max" in the graph GR2 indicates the maximum inspiration amount (maximum inspiration amount) reached by the inspiration before the utterance. A maximum inspiration-utterance time "T_bmax_uttr" indicates an interval (pre-utterance time) from the time when the maximum inspiration amount is reached to the time (utterance start time) when the utterance is started. In the example of FIG. 12, the maximum inspiration-utterance time "T_bmax_uttr" indicates a difference between a time t2 indicating the time when the utterance is started (utterance start time) and a time t1 indicating the time when the maximum inspiration amount is reached.

For example, the increase amount "B_increase" in the graph GR2 indicates a change (increase amount) in the inspiration amount before reaching the maximum respiration amount "B_max". Note that the increase amount "B_increase" may be a change (increase amount) in the inspiration amount at the acquisition time point (current time point) of the inspiration information.

For example, the inspiration information includes the increase amount "B_increase" in FIG. 12, the maximum respiration amount "B_max", and the maximum inspiration-utterance time "T_bmax_uttr". Note that the maximum inspiration-utterance time "T_bmax_uttr" may not be included in the inspiration information. In this case, the score of "c*(1/T_bmax_uttr)" which is the term (third term) related to the maximum inspiration-utterance time "T_bmax_uttr" may be calculated as "0". Furthermore, the maximum respiration amount "B_max" may not be included. In this case, server apparatus 100 may predict maximum respiration amount "B_max" as described with reference to FIG. 2, and calculate the score using the predicted maximum respiration amount "B_max".

The server apparatus 100 calculates the utterance score "Score_uttr", which is a score used for the utterance prediction, using the increase amount "B_increase", the maximum respiration amount "B_max", the maximum inspiration-utterance time "T_bmax_uttr", and the following Formula (2).

[Mathematical formula 2]

$$\text{Score\_uttr} = a*B\_\max + b*B\_\text{increase} + c*(1/T\_b\_\max\_\text{uttr}) \quad (2)$$

"a", "b", and "c" in the above Formula (2) represent predetermined constants. Note that the above Formula (2) is an example of calculation of the utterance score "Score_uttr", and various expressions may be used to calculate the utterance score "Score_uttr".

Then, the server apparatus 100 classifies inspiration of the user U1 with two thresholds of an utterance presence/absence threshold "Threshold_uttr" and a request type utterance threshold "Threshold_ask". The server apparatus 100 classifies the inspiration of the user U1 by comparing the utterance score "Score_uttr" with each threshold. In other words, the server apparatus 100 classifies the utterance type according to the value of the utterance score "Score_uttr".

As illustrated in a classification result PD2 in FIG. 13, the server apparatus 100 classifies inspiration of the user U1 by comparing the utterance score "Score_uttr" with the utterance presence/absence threshold "Threshold_uttr" and the request type utterance threshold "Threshold_ask". In the example of FIG. 13, the utterance presence/absence threshold "Threshold_uttr" is smaller than the request type utterance threshold "Threshold_ask".

In the example of FIG. 13, in a case where the utterance score "Score_uttr" is larger than the request type utterance threshold "Threshold_ask", the server apparatus 100 classifies the inspiration of the user U1 as the inspiration having a high possibility of a request utterance (also referred to as "request type inspiration"). In this case, the information processing system 1 activates a voice UI (voice recognition) with an explicit activation notification, for example, and performs a normal flow (processing).

Furthermore, in the example of FIG. 13, in a case where the utterance score "Score_uttr" is equal to or less than the request type utterance threshold "Threshold_ask" and is larger than the utterance presence/absence threshold "Threshold_uttr", the server apparatus 100 classifies the inspiration of the user U1 into inspiration (also referred to as "intermediate value") for which the possibility of the request utterance is conceivable but the accuracy is not high. In this case, for example, the information processing system 1 activates the voice recognition without explicit activation notification, and activates the notification type response flow.

Furthermore, in the example of FIG. 13, in a case where the utterance score "Score_uttr" is equal to or less than the utterance presence/absence threshold "Threshold_uttr", the server apparatus 100 classifies the inspiration of the user U1 as inspiration (also referred to as "complete non-request type inspiration") in which no utterance is assumed. In this case, the information processing system 1 does not activate the voice UI (voice recognition).

In this manner, the server apparatus 100 classifies the inspiration of the user U1 by comparing the utterance score "Score_uttr" with the utterance presence/absence threshold "Threshold_uttr" and the request type utterance threshold "Threshold_ask". Note that each threshold such as the utterance presence/absence threshold "Threshold_uttr" and the request type utterance threshold "Threshold_ask" may be increased or decreased in accordance with a change in the normal respiration range due to a change in the motion state of the user and the like.

As described above, the utterance score "Score_uttr" is a value obtained by adding the maximum respiration amount, the increase amount, and the time from the maximum respiration to the utterance (maximum inspiration-utterance time). The server apparatus 100 classifies the respiration of the user by using the utterance score "Score_uttr". Therefore, the server apparatus 100 can appropriately classify the inspiration of the user and use it for selection of processing.

From here, the description will be continued returning to FIG. 11. In a case where the inspiration of the user U1 is classified into the request type inspiration in Step S301, the information processing system 1 performs the activation processing and causes the user U1 to recognize the activation (Step S311). In the example of FIG. 11, the terminal device 10 causes the user U1 to recognize the activation by turning on the light source unit 18. Therefore, the user U1 can recognize that voice input has become possible.

Then, the user U1 makes an utterance (Step S312). For example, the user U1 performs voice input requesting predetermined information to the terminal device 10.

Then, the information processing system 1 performs conventional processing (processing of the voice interaction system) on the input by the user U1 (Step S313). For example, the information processing system 1 interprets an input of the user by the natural language understanding (NLU) and executes corresponding processing (Action). In the example of FIG. 11, the terminal device 10 performs voice output processing in response to the request of the user U1, "OK. Here's the result . . . ".

Furthermore, in a case where the inspiration of the user U1 is classified into the intermediate value in Step S301, the information processing system 1 starts the voice recognition without Response (response) (Step S321).

Then, the user U1 makes an utterance (Step S322). For example, the user U1 performs voice input requesting predetermined information to the terminal device 10.

Then, the information processing system 1 acquires Intent (intent) by the natural language understanding (NLU) without Response (response) (Step S323).

Then, the information processing system 1 performs a notification type Response (response) (Step S324). In the example of FIG. 11, the terminal device 10 performs voice output processing on the user U1, saying "I have an idea for your . . . ". Note that the information processing system 1 may determine whether or not to permit notification by determining whether or not the user continues the same topic or whether or not the conversation is continuing.

Meanwhile, in a case where the inspiration of the user U1 is classified into the complete non-request type inspiration in Step S301, the information processing system 1 does not start the activation processing (Step S331). The information processing system 1 does not activate the voice recognition. The terminal device 10 does not start the voice recognition.

As described above, the information processing system 1 can perform appropriate processing according to a pre-utterance respiration state by selecting the processing using the classification result of the inspiration of the user. For example, the information processing system 1 can use the classification result of inspiration of the user to enable omission of the activation word according to the pre-utterance respiration state.

1-6-2. Example of Switching Local/Cloud Voice Recognition

Figure 14:
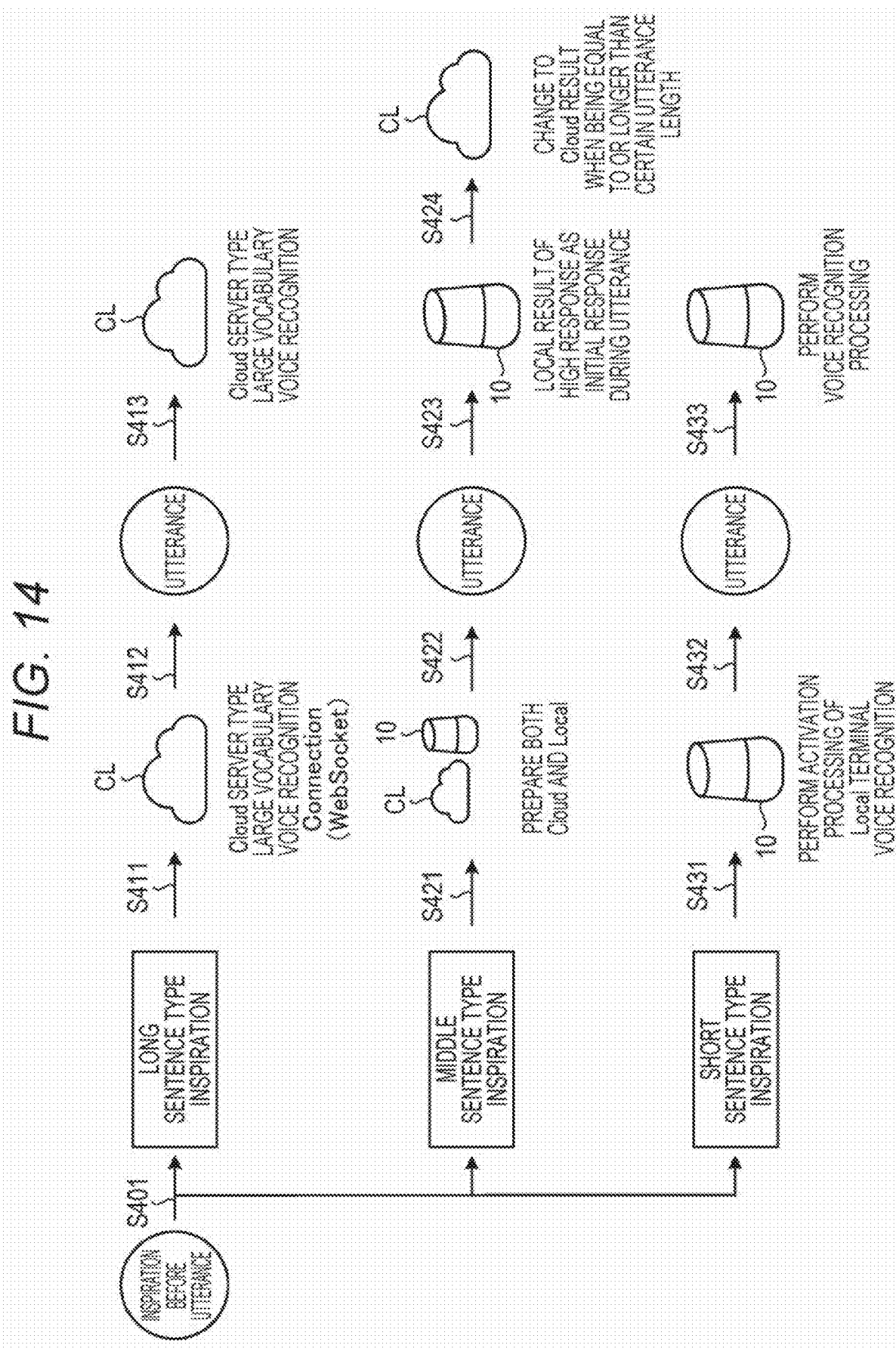
FIG. 14 is a diagram illustrating an example of processing using the classification result of the inspiration.

An example of the classification processing will be described with reference to FIG. 14. FIG. 14 is a diagram illustrating an example of processing using the classification result of the inspiration. FIG. 14 illustrates an example of switching local/cloud voice recognition.

First, in the example of FIG. 14, the server apparatus 100 acquires the inspiration information indicating the inspiration before the utterance of the user U1. For example, the server apparatus 100 acquires the inspiration information indicating the inspiration of the user U1 from the terminal device 10 used by the user U1.

The server apparatus 100 performs the classification processing using the inspiration information indicating the inspiration of the user U1 (Step S401). The server apparatus 100 calculates the score using the inspiration information. Then, the server apparatus 100 classifies the inspiration of the user U1 by comparing the calculated score with the threshold. The server apparatus 100 classifies the inspiration of the user U1 on the basis of a magnitude relationship between the calculated score and each threshold.

Figure 15:
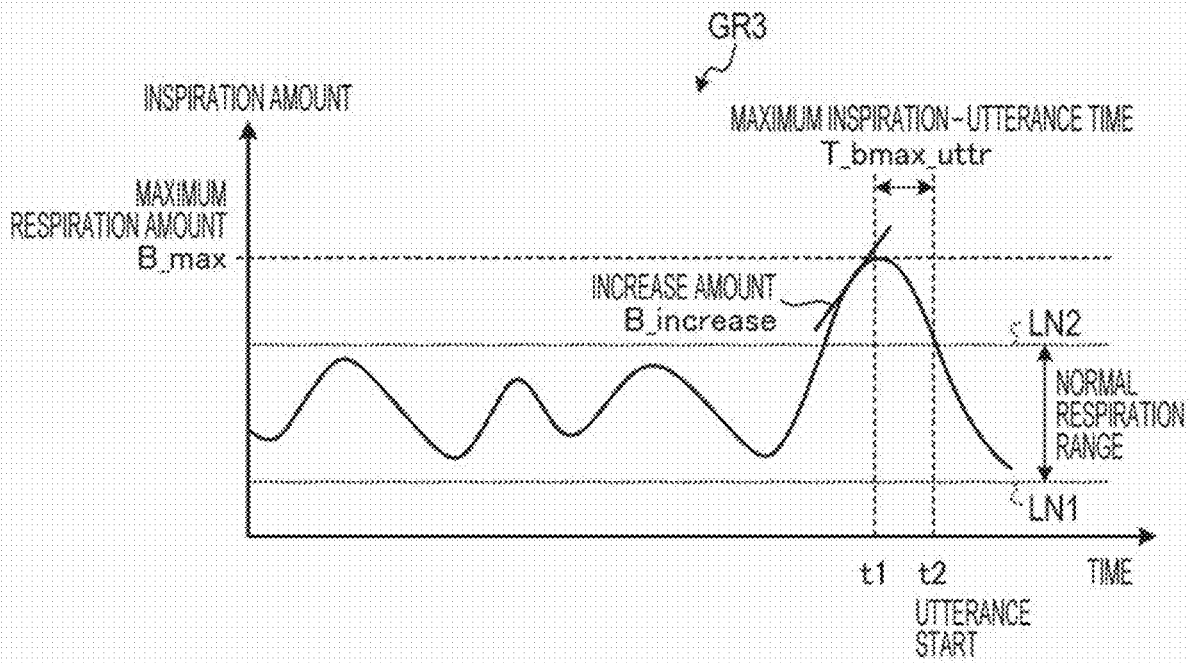
FIG. 15 is a diagram illustrating an example of the inspiration information of the user.
Figure 16:
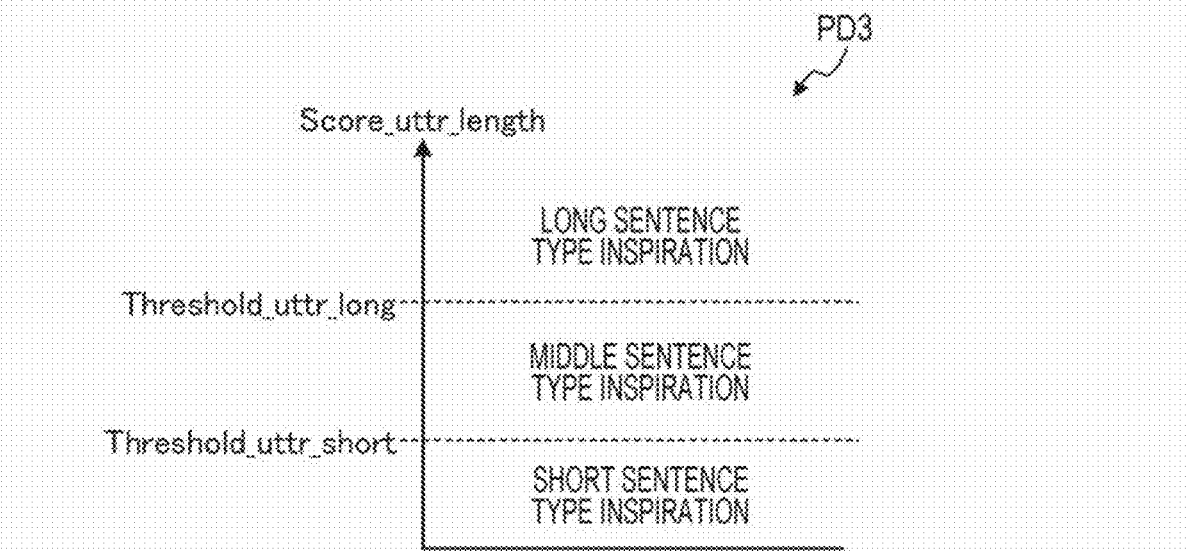
FIG. 16 is a diagram illustrating an example of the prediction using the inspiration of the user.

Hereinafter, the above-described classification processing performed by the server apparatus 100 will be specifically described with reference to FIGS. 15 and 16. FIG. 15 is a diagram illustrating an example of the inspiration information of the user. FIG. 16 is a diagram illustrating an example of the prediction using the inspiration of the user.

A graph GR3 in FIG. 15 is a graph illustrating a relationship between a time and the inspiration amount, where a horizontal axis represents time and a vertical axis represents the inspiration amount. Note that, in the graph GR3, descriptions of points similar to the graph GR1 in FIG. 2 and the graph GR2 in FIG. 12 are omitted.

For example, the maximum respiration amount "B_max" in the graph GR3 indicates the maximum inspiration amount (maximum inspiration amount) reached by the inspiration before the utterance. The maximum inspiration-utterance time "T_bmax_uttr" indicates an interval from the time when the maximum inspiration amount is reached to the time when the utterance is started (utterance start time).

For example, the increase amount "B_increase" in the graph GR3 indicates the change (increase amount) in the inspiration amount before reaching the maximum respiration amount "B_max". Note that the increase amount "B_increase" may be a change (increase amount) in the inspiration amount at the acquisition time point (current time point) of the inspiration information.

For example, the inspiration information includes the increase amount "B_increase", the maximum respiration amount "B_max", and the maximum inspiration-utterance time "T_bmax_uttr" in FIG. 15. Note that the maximum inspiration-utterance time "T_bmax_uttr" may not be included in the inspiration information. In this case, the score of "c*(1/T_bmax_uttr)" which is the term (third term) related to the maximum inspiration-utterance time "T_bmax_uttr" may be calculated as "0". Furthermore, the maximum respiration amount "B_max" may not be included. In this case, server apparatus 100 may predict maximum respiration amount "B_max" as described with reference to FIG. 2, and calculate the score using the predicted maximum respiration amount "B_max".

The server apparatus 100 calculates an utterance length estimation score "Score_uttr_length" which is the score used for the utterance prediction using the increase amount "B_increase", the maximum respiration amount "B_max", the maximum inspiration-utterance time "T_bmax_uttr", and following Formula (3).

[Mathematical formula 3]

$$\text{Score\_uttr\_length} = a*B\_\max + b*B\_\text{increase} + c*(1/T\_b\max\_\text{uttr}) \quad (3)$$

"a", "b", and "c" in the above Formula (3) represent predetermined constants. The above Formula (3) is similar to the above Formula (2), but the values of "a", "b", and "c" are different, and the relation of the maximum inspiration amount is considered to be large. Therefore, for example, the coefficient "a" is relatively large as compared with the above Formula (2). Note that the above Formula (3) is an example of calculation of the utterance length estimation score "Score_uttr_length", and various expressions may be used to calculate the utterance length estimation score "Score_uttr_length".

Then, the server apparatus 100 classifies the inspiration of the user U1 by two thresholds of a short sentence utterance threshold "Threshold_uttr_short" and a long sentence utterance threshold "Threshold_uttr_long". The server apparatus 100 classifies the inspiration of the user U1 by comparing the utterance length estimation score "Score_uttr_length" with each threshold. That is, the server apparatus 100 classifies the utterance type according to the value of the utterance length estimation score "Score_uttr_length".

As illustrated in a classification result PD3 in FIG. 16, the server apparatus 100 classifies the inspiration of the user U1 by comparing the utterance length estimation score "Score_uttr_length" with the short sentence utterance threshold "Threshold_uttr_short" and the long sentence utterance threshold "Threshold_uttr_long". In the example of FIG. 16, the short sentence utterance threshold "Threshold_uttr_short" is smaller than the long sentence utterance threshold "Threshold_uttr_long".

In the example of FIG. 16, in a case where the utterance length estimation score "Score_uttr_length" is larger than the long sentence utterance threshold "Threshold_uttr_long", the server apparatus 100 classifies the utterance as inspiration (also referred to as "long sentence type inspiration") with a high possibility of long sentence utterance. In this case, the information processing system 1 prepares for activation of cloud voice recognition and performs processing on the utterance. For example, the information processing system 1 activates voice recognition of the server apparatus 100, and performs processing on the utterance by the server apparatus 100.

Furthermore, in the example of FIG. 16, in a case where the utterance length estimation score "Score_uttr_length" is equal to or less than the long sentence utterance threshold "Threshold_uttr_long" and is larger than the short sentence utterance threshold "Threshold_uttr_short", the server apparatus 100 classifies the utterance into inspiration (also referred to as "middle sentence type inspiration") that makes it difficult to clearly estimate whether the utterance length is a long sentence or a short sentence. In this case, the information processing system 1 prepares, for example, both the cloud type local types. For example, the information processing system 1 activates the voice recognition of the server apparatus 100 and the terminal device 10. In this case, for example, the information processing system 1 uses local recognition at the beginning of utterance, and a cloud recognition result as necessary.

Furthermore, in the example of FIG. 16, in a case where the utterance length estimation score "Score_uttr_length" is equal to or less than the short sentence utterance threshold "Threshold_uttr_short", the server apparatus 100 classifies the utterance as inspiration (also referred to as "short sentence type inspiration") with a high possibility of short sentence utterance. In this case, the information processing system 1 prepares for activation of local voice recognition and performs processing on the utterance. For example, the information processing system 1 activates the voice recognition of the terminal device 10 and performs processing on the utterance by the terminal device 10.

In this manner, the server apparatus 100 classifies the inspiration of the user U1 by comparing the utterance length estimation score "Score_uttr_length" with the short sentence utterance threshold "Threshold_uttr_short" and the long sentence utterance threshold "Threshold_uttr_long". Note that each threshold such as the short sentence utterance threshold "Threshold_uttr_short" and the long sentence utterance threshold "Threshold_uttr_long" may be increased or decreased according to a change in the normal respiration range due to a change in the motion state of the user and the like.

As described above, the utterance length estimation score "Score_uttr_length" is a value obtained by adding the maximum respiration amount, the increase amount, and the time (maximum inspiration-utterance time) from the maximum respiration to the utterance. The server apparatus 100 classifies the respiration of the user by using the utterance length estimation score "Score_uttr_length". Therefore, the server apparatus 100 can appropriately classify the inspiration of the user and use it for selection of processing.

From here, the description will be continued returning to FIG. 14. In a case where the inspiration of the user U1 is classified into the long sentence type inspiration in Step S401, the information processing system 1 starts the cloud CL (server type) large vocabulary voice recognition (Step S411). In the example of FIG. 14, the information processing system 1 performs connection between the server apparatus 100 and the terminal device 10 by WebSocket and the like.

Then, the user U1 makes an utterance (Step S412). Then, the information processing system 1 performs processing on the utterance of the user U1 using the cloud (server type)

large vocabulary voice recognition (Step S413). For example, the information processing system 1 performs processing on the utterance of the user using the cloud (server type) large vocabulary voice recognition. Therefore, the information processing system 1 can improve long sentence performance by the large vocabulary voice recognition.

Furthermore, in a case where the inspiration of the user U1 is classified into the middle sentence type inspiration in Step S401, the information processing system 1 prepares both the cloud CL and the local (Step S421). For example, the information processing system 1 activates the voice recognition of the server apparatus 100 and the terminal device 10.

Then, the user U1 makes an utterance (Step S422). Then, the information processing system 1 responds a local result of the high response as an initial response during the utterance (Step S423). For example, the information processing system 1 performs an initial response by voice recognition of the terminal device 10.

Then, when the utterance length becomes equal to or longer than the certain utterance length, the information processing system 1 changes the utterance length to the cloud CL result (Step S424). For example, in a case where the utterance length is equal to or longer than the certain utterance length, the information processing system 1 changes the response to a response on the basis of voice recognition of the server apparatus 100. As described above, the information processing system 1 locally processes the initial response, and processes the initial response on the cloud CL side having a large backup data amount in a case where the initial response is a long sentence.

Furthermore, in a case where the inspiration of the user U1 is classified into the short sentence type inspiration in Step S401, the information processing system 1 performs the activation processing of the local terminal voice recognition (Step S431). In the example of FIG. 14, the information processing system 1 performs processing of activating voice recognition of the terminal device 10.

Then, the user U1 makes an utterance (Step S432). Then, the information processing system 1 performs processing on the utterance by the voice recognition of the terminal device 10 (Step S433). In this case, the information processing system 1 can make a high response and does not need data communication.

As described above, the information processing system 1 can perform appropriate processing according to a pre-utterance respiration state by selecting the processing using the classification result of the inspiration of the user. For example, the information processing system 1 can switch (select) between local and cloud voice recognition using the classification result of the inspiration of the user. Therefore, the information processing system 1 can take into account the necessity of high response and data communication of the local voice recognition and appropriately use the long sentence recognition performance of the cloud voice recognition according to conditions.

1-6-3. Modification Example of Voice Recognition Dictionary

Figure 17:
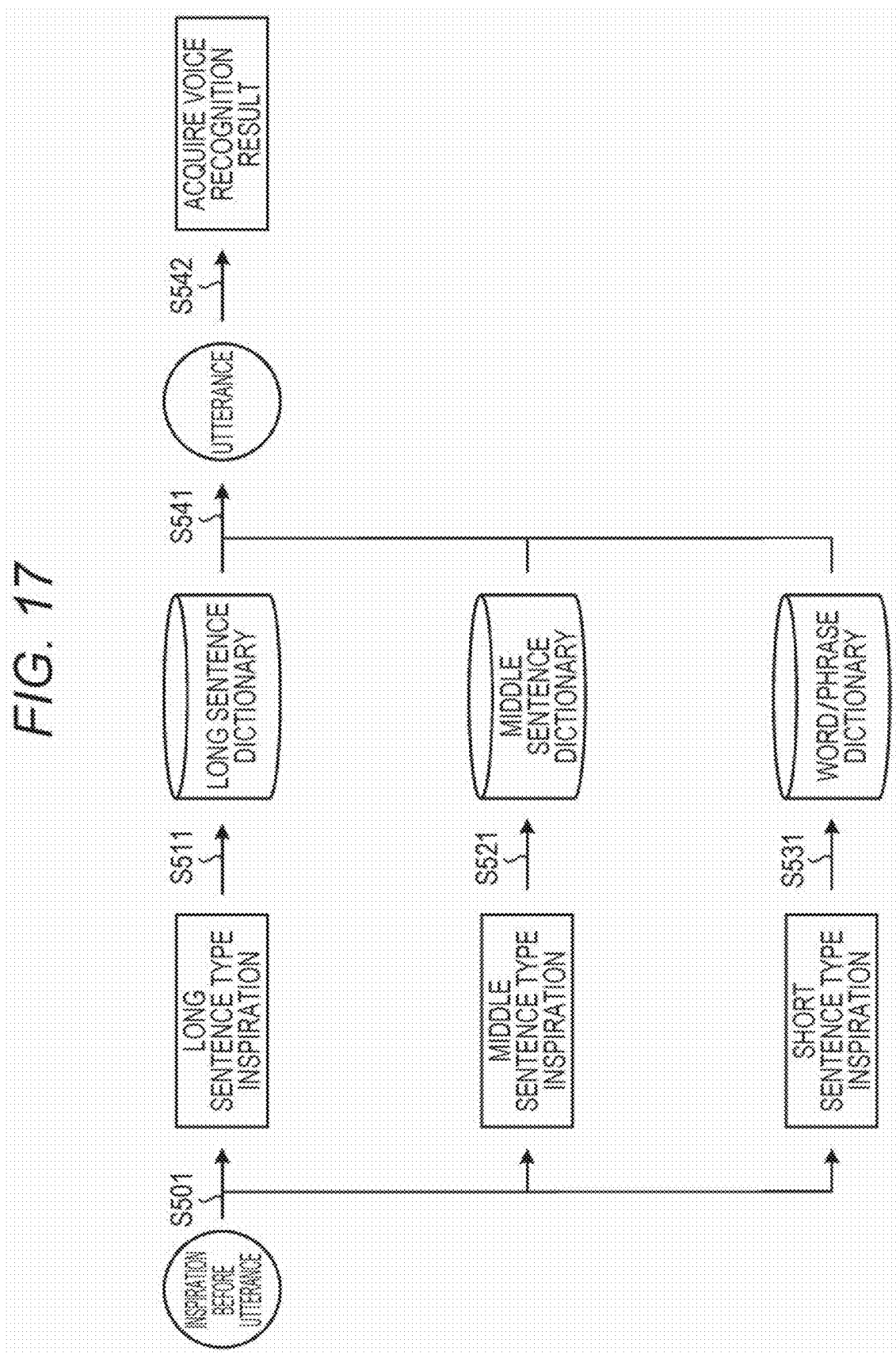
FIG. 17 is a diagram illustrating an example of processing using the classification result of the inspiration.

An example of the classification processing will be described with reference to FIG. 17. FIG. 17 is a diagram illustrating an example of processing using the classification result of the inspiration. FIG. 17 illustrates a modification example of the voice recognition dictionary.

First, in the example of FIG. 17, the server apparatus 100 acquires the inspiration information indicating the inspiration before the utterance of the user U1. For example, the server apparatus 100 acquires the inspiration information indicating the inspiration of the user U1 from the terminal device 10 used by the user U1.

The server apparatus 100 performs the classification processing using the inspiration information indicating the inspiration of the user U1 (Step S501). The server apparatus 100 calculates the score using the inspiration information. Then, the server apparatus 100 classifies the inspiration of the user U1 by comparing the calculated score with the threshold. The server apparatus 100 classifies the inspiration of the user U1 on the basis of a magnitude relationship between the calculated score and each threshold.

Figure 18:
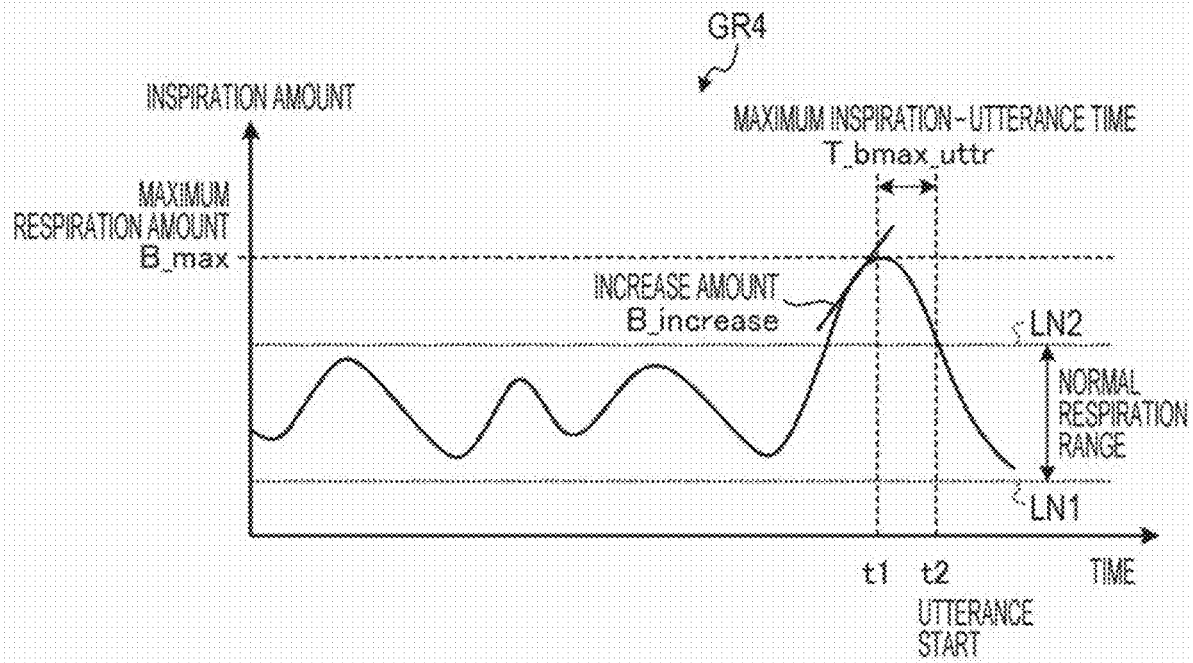
FIG. 18 is a diagram illustrating an example of the inspiration information of the user.
Figure 19:
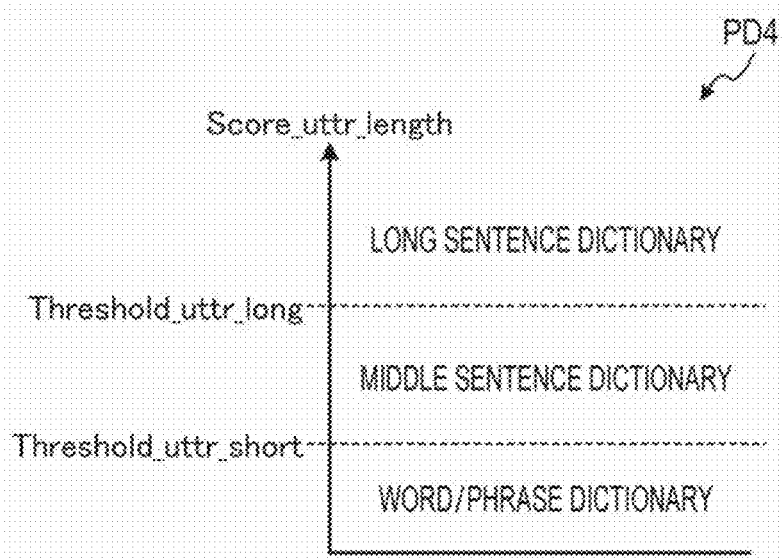
FIG. 19 is a diagram illustrating an example of the prediction using the inspiration of the user.

Hereinafter, the above-described classification processing performed by the server apparatus 100 will be specifically described with reference to FIGS. 18 and 19. FIG. 18 is a diagram illustrating an example of the inspiration information of the user. FIG. 19 is a diagram illustrating an example of the prediction using the inspiration of the user.

A graph GR4 in FIG. 18 is a graph illustrating a relationship between a time and the inspiration amount, where a horizontal axis represents time and a vertical axis represents the inspiration amount. Note that, in the graph GR4, descriptions of points similar to the graph GR1 in FIG. 2 and the graph GR2 in FIG. 12 is omitted.

For example, the maximum respiration amount "B_max" in the graph GR4 indicates the maximum inspiration amount (maximum inspiration amount) reached by the inspiration before the utterance. The maximum inspiration-utterance time "T_bmax_uttr" indicates an interval from the time when the maximum inspiration amount is reached to the time when the utterance is started (utterance start time).

For example, the increase amount "B_increase" in the graph GR4 indicates a change (increase amount) in the inspiration amount before reaching the maximum respiration amount "B_max". Note that the increase amount "B_increase" may be a change (increase amount) in the inspiration amount at the acquisition time point (current time point) of the inspiration information.

For example, the inspiration information includes the increase amount "B_increase" in FIG. 18, the maximum respiration amount "B_max", and the maximum inspiration-utterance time "T_bmax_uttr". Note that the maximum inspiration-utterance time "T_bmax_uttr" may not be included in the inspiration information. In this case, the score of "c*(1/T_bmax_uttr)" which is the term (third term) related to the maximum inspiration-utterance time "T_bmax_uttr" may be calculated as "0". Furthermore, the maximum respiration amount "B_max" may not be included. In this case, server apparatus 100 may predict maximum respiration amount "B_max" as described with reference to FIG. 2, and calculate the score using the predicted maximum respiration amount "B_max".

The server apparatus 100 calculates the utterance length estimation score "Score_uttr_length" which is a score used for the utterance prediction using the increase amount "B_increase", the maximum respiration amount "B_max", the maximum inspiration-utterance time "T_bmax_uttr", and following Formula (4).

[Mathematical formula 4]

$$\text{Score\_uttr\_length} = a*B\_\max + b*B\_\text{increase} + c*(1/T\_b\max\_\text{uttr}) \quad (4)$$

"a", "b", and "c" in the above Formula (4) represent predetermined constants. The above Formula (4) is similar to the above Formula (2), but the values of "a", "b", and "c" are different, and the relation of the maximum inspiration amount is considered to be large. Therefore, for example, the coefficient "a" is relatively large as compared with the above Formula (2). Note that the above Formula (4) is an example of calculation of the utterance length estimation score "Score_uttr_length", and various expressions may be used to calculate the utterance length estimation score "Score_uttr_length".

Then, the server apparatus 100 classifies the inspiration of the user U1 by two thresholds of a short sentence utterance threshold "Threshold_uttr_short" and a long sentence utterance threshold "Threshold_uttr_long". The server apparatus 100 classifies the inspiration of the user U1 by comparing the utterance length estimation score "Score_uttr_length" with each threshold. That is, the server apparatus 100 classifies the utterance type according to the value of the utterance length estimation score "Score_uttr_length".

As indicated by a classification result PD4 in FIG. 19, the server apparatus 100 classifies the inspiration of the user U1 by comparing the utterance length estimation score "Score_uttr_length" with the short sentence utterance threshold "Threshold_uttr_short" and the long sentence utterance threshold "Threshold_uttr_long". In the example of FIG. 19, the short sentence utterance threshold "Threshold_uttr_short" is smaller than the long sentence utterance threshold "Threshold_uttr_long".

In the example of FIG. 19, in a case where the utterance length estimation score "Score_uttr_length" is larger than the long sentence utterance threshold "Threshold_uttr_long", the server apparatus 100 classifies the utterance as inspiration (also referred to as "long sentence type inspiration") with a high possibility of long sentence utterance. In this case, the information processing system 1 prepares a long sentence type voice recognition dictionary. For example, the server apparatus 100 acquires information of a long sentence dictionary among the dictionaries stored in the storage unit 120, and performs voice recognition processing using the acquired information.

Furthermore, in the example of FIG. 19, in a case where the utterance length estimation score "Score_uttr_length" is equal to or less than the long sentence utterance threshold "Threshold_uttr_long" and is larger than the short sentence utterance threshold "Threshold_uttr_short", the server apparatus 100 classifies the utterance length estimation score into inspiration (also referred to as "middle sentence type inspiration") that makes it difficult to clearly estimate whether the utterance length is a long sentence or a short sentence. In this case, the information processing system 1 prepares a middle sentence type voice recognition dictionary. For example, the server apparatus 100 acquires information of the middle sentence dictionary among the dictionaries stored in the storage unit 120, and performs the voice recognition processing using the acquired information.

Furthermore, in the example of FIG. 19, in a case where the utterance length estimation score "Score_uttr_length" is equal to or less than the short sentence utterance threshold "Threshold_uttr_short", the server apparatus 100 classifies the utterance as inspiration (also referred to as "short sentence type inspiration") having a high possibility of short sentence utterance. In this case, the information processing system 1 prepares a short sentence type voice recognition dictionary (word/phrase). For example, the server apparatus 100 acquires information of a word/phrase dictionary among the dictionaries stored in the storage unit 120, and performs the voice recognition processing using the acquired information.

In this manner, the server apparatus 100 classifies the inspiration of the user U1 by comparing the utterance length estimation score "Score_uttr_length" with the short sentence utterance threshold "Threshold_uttr_short" and the long sentence utterance threshold "Threshold_uttr_long". Note that each threshold such as the short sentence utterance threshold "Threshold_uttr_short" and the long sentence utterance threshold "Threshold_uttr_long" may be increased or decreased according to a change in the normal respiration range due to a change in the motion state of the user and the like.

As described above, the utterance length estimation score "Score_uttr_length" is a value obtained by adding the maximum respiration amount, the increase amount, and the time (maximum inspiration-utterance time) from the maximum respiration to the utterance. The server apparatus 100 classifies the respiration of the user by using the utterance length estimation score "Score_uttr_length". Therefore, the server apparatus 100 can appropriately classify the inspiration of the user and use it for selection of processing.

From here, the description will be continued returning to FIG. 17. In a case where the inspiration of the user U1 is classified into the long sentence type inspiration in Step S501, the information processing system 1 selects the long sentence dictionary (Step S511). For example, the server apparatus 100 selects information of the long sentence dictionary from among the dictionaries stored in the storage unit 120.

Then, the user U1 makes an utterance (Step S541). Then, the information processing system 1 acquires a voice recognition result using the selected dictionary (Step S542). For example, the information processing system 1 acquires a voice recognition result using the long sentence dictionary.

Furthermore, in a case where the inspiration of the user U1 is classified into the middle sentence type inspiration in Step S501, the middle sentence dictionary is selected (Step S521). For example, the server apparatus 100 selects the information of the middle sentence dictionary from among the dictionaries stored in the storage unit 120.

Then, the user U1 makes an utterance (Step S541). Then, the information processing system 1 acquires a voice recognition result using the selected dictionary (Step S542). For example, the information processing system 1 acquires a voice recognition result using the middle sentence dictionary.

Furthermore, in a case where the inspiration of the user U1 is classified into the short sentence type inspiration in Step S501, a word/phrase dictionary is selected (Step S521). For example, the server apparatus 100 selects the information of the word/phrase dictionary for short sentence from among the dictionaries stored in the storage unit 120.

Then, the user U1 makes an utterance (Step S541). Then, the information processing system 1 acquires a voice recognition result using the selected dictionary (Step S542). For example, the information processing system 1 acquires a voice recognition result using the word/phrase dictionary.

As described above, the information processing system 1 can change the dictionary used in the voice recognition according to the utterance length, and improve the voice recognition performance.

In a case where the utterance content and the characteristics of the recognition engine do not match, for example, the accuracy of an utterance in units of one word or word decreases. For example, when the voice recognition dictionary for long sentences is used for word utterance, the recognition performance may be greatly deteriorated.

However, the information processing system 1 estimates whether the utterance is a short utterance or a long utterance from the respiration state and changes the voice recognition engine dictionary. As described above, the information processing system 1 can suppress the degradation of the performance as described above by selecting the dictionary according to the classification of the inspiration.

1-6-4. Modification Example of UI Selected According to Inspiration State

Figure 20:
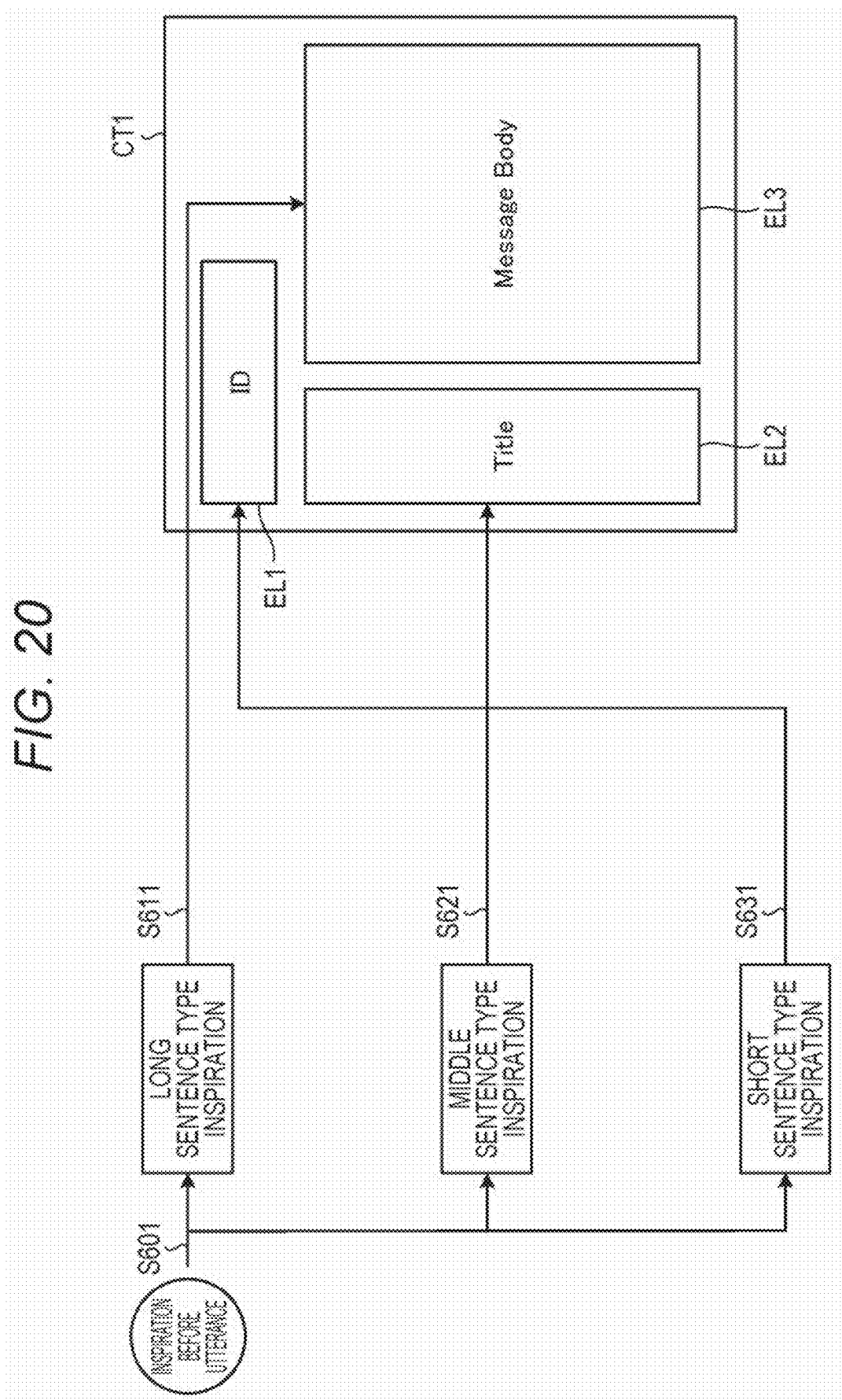
FIG. 20 is a diagram illustrating an example of the processing using the classification result of the inspiration.

Note that the information processing system 1 is not limited to the above-described example, and may select various types of information and processing on the basis of the classification of the long sentence type inspiration to the short sentence type inspiration. This point will be described with reference to FIG. 20. FIG. 20 is a diagram illustrating an example of processing using the classification result of the inspiration.

Specifically, FIG. 20 illustrates a case where the UI selected from the estimation of the utterance length according to the inspiration state is changed. As illustrated in the content CT1 in FIG. 20, the information processing system 1 selects a suitable UI element according to an assumed utterance amount even when the UI element is randomly laid out.

In the content CT1 in FIG. 20, for example, the content CT1 is displayed on the display unit 16 (screen) of the terminal device 10. In the content CT1, an element EL1 corresponding to an ID, an element EL2 corresponding to Title, and an element EL3 corresponding to a MessageBody (text) are randomly arranged. A short input such as a number is assumed as the ID. Furthermore, as Title, input of a middle sentence of about several words is assumed. Furthermore, it is assumed that a long sentence such as a free sentence is input to the MessageBody. Therefore, as illustrated in FIG. 20, the area occupied by the element EL1, the element EL2, and the element EL3 increases in this order.

The server apparatus 100 performs the classification processing using the inspiration information indicating the inspiration of the user U1 (Step S601). Note that Step S601 is similar to Step S501, and thus description thereof is omitted.

In a case where the inspiration of the user U1 is classified into the long sentence type inspiration in Step S601, the information processing system 1 selects the element EL3 corresponding to the MessageBody among the elements EL1 to EL3 in the content CT1 (Step S611). For example, the terminal device 10 selects the element EL3 corresponding to the MessageBody as an input target.

In a case where the inspiration of the user U1 is classified into the middle sentence type inspiration in Step S601, the information processing system 1 selects the element EL2 corresponding to Title among the elements EL1 to EL3 in the content CT1 (Step S621). For example, the terminal device 10 selects the element EL2 corresponding to Title as an input target.

In a case where the inspiration of the user U1 is classified into the short sentence type inspiration in Step S601, the information processing system 1 selects the element EL1 corresponding to the ID among the elements EL1 to EL3 in the content CT1 (Step S631). For example, the terminal device 10 selects the element EL1 corresponding to the ID as an input target.

Note that the above is an example, and the information processing system 1 may determine the element by appropriately using various types of information. In a case where the UI element is uniquely determined, the information processing system 1 automatically determines the input destination. However, in a case where there is a plurality of UI elements in which input of the same length is assumed, or in a case where the system side cannot automatically determine the input destination, the information processing system 1 may determine the input element by performing processing such as inquiry to the user.

1-6-5. Modification Example of System Response

Figure 21:
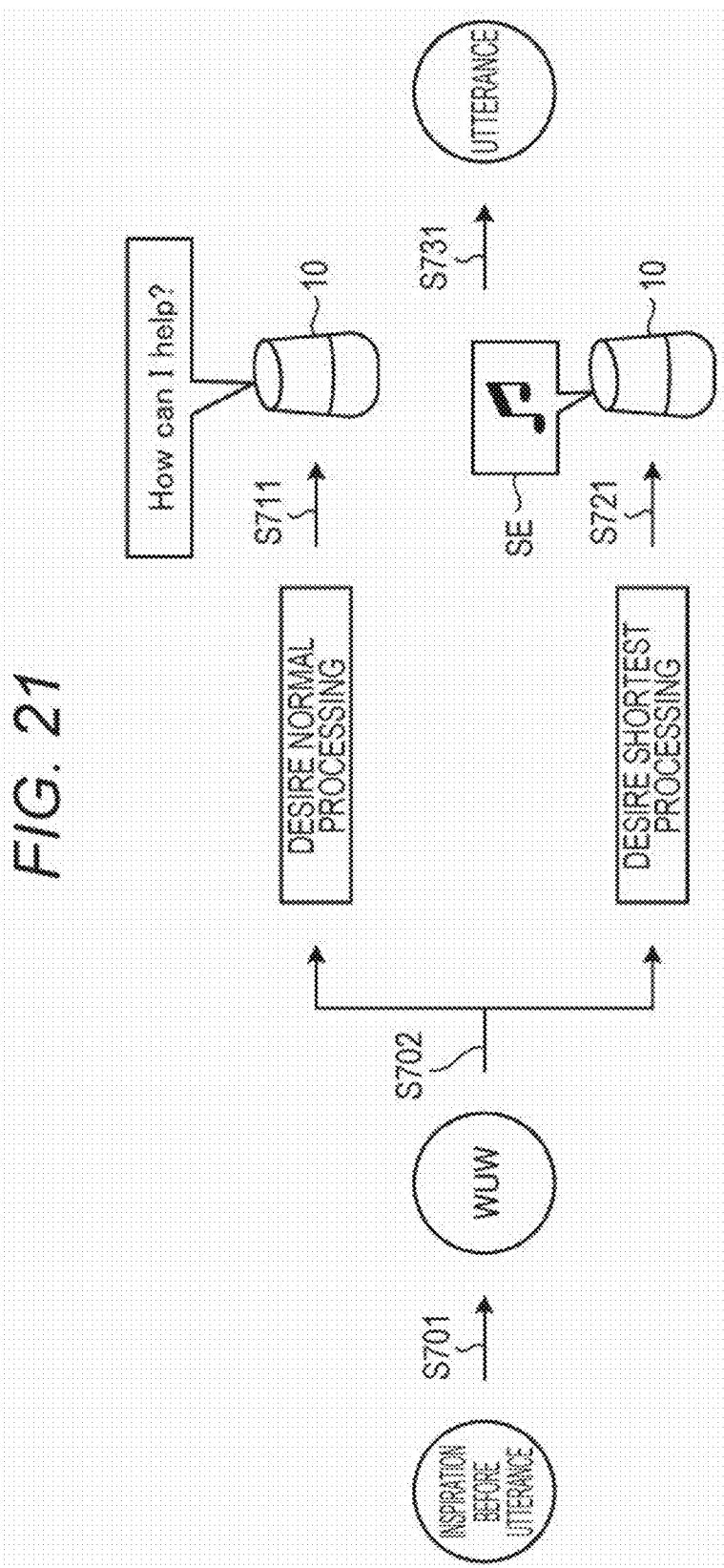
FIG. 21 is a diagram illustrating an example of the processing using the classification result of the inspiration.
Figure 22:
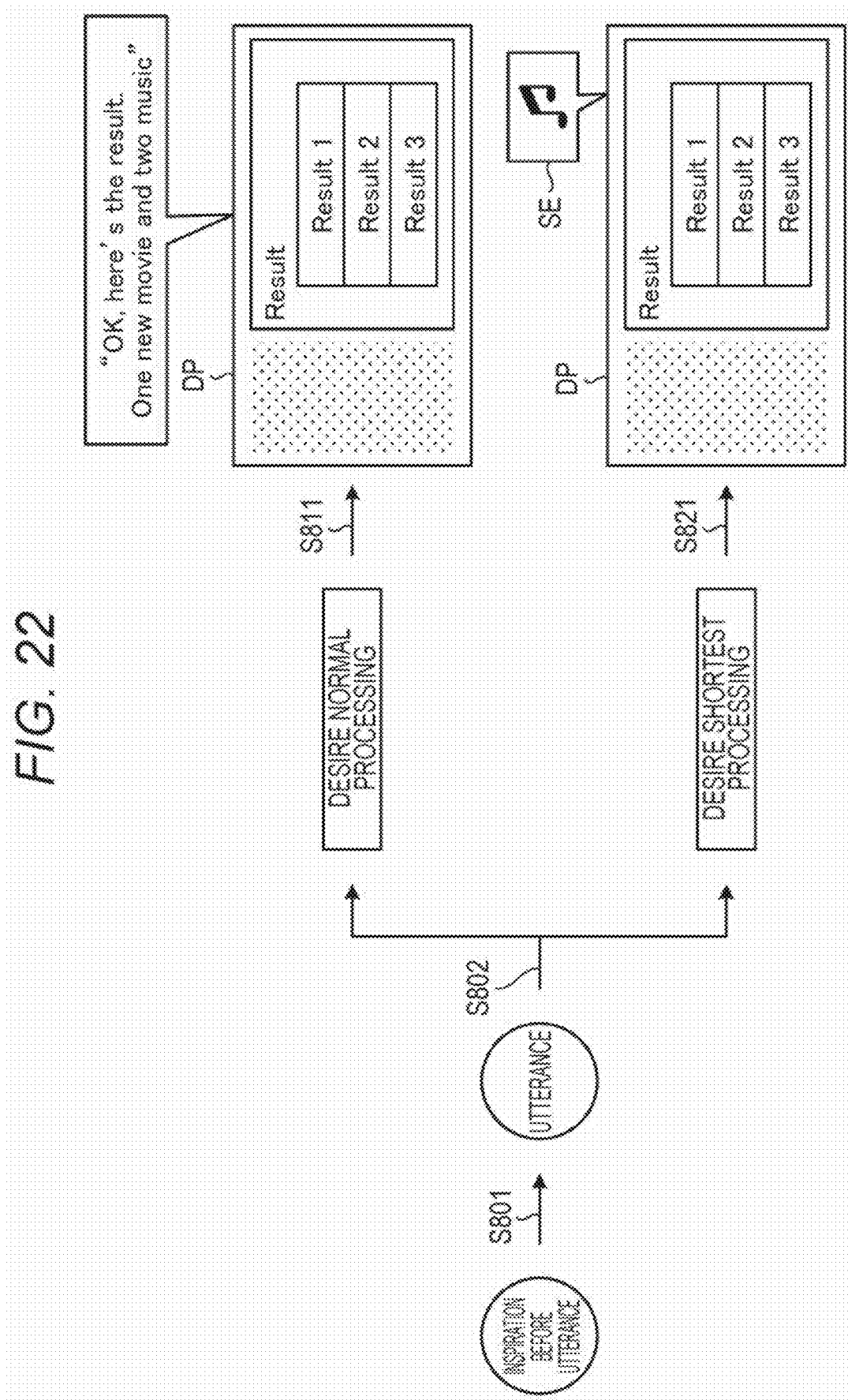
FIG. 22 is a diagram illustrating an example of the processing using the classification result of the inspiration.

An example of the classification processing will be described with reference to FIGS. 21 and 22. FIGS. 21 and 22 are diagrams illustrating an example of processing using the classification result of inspiration. First, an example of FIG. 21 will be described. FIG. 21 illustrates a modification example of the system response (Text-To-Speech). Specifically, FIG. 21 illustrates an example of a response change at the time of Wake up Word (Wuw).

First, in the example of FIG. 21, the server apparatus 100 acquires the inspiration information indicating the inspiration before the utterance of the user U1. For example, the server apparatus 100 acquires the inspiration information indicating the inspiration of the user U1 from the terminal device 10 used by the user U1.

The inspiration before the utterance of the user U1 is performed (Step S701), and then, the user U1 utters WUW (Step S702). The server apparatus 100 performs the classification processing using the inspiration information of the user U1. The server apparatus 100 calculates the score using the inspiration information. Then, the server apparatus 100 classifies the inspiration of the user U1 by comparing the calculated score with the threshold. The server apparatus 100 classifies the inspiration of the user U1 on the basis of a magnitude relationship between the calculated score and each threshold.

Figure 23:
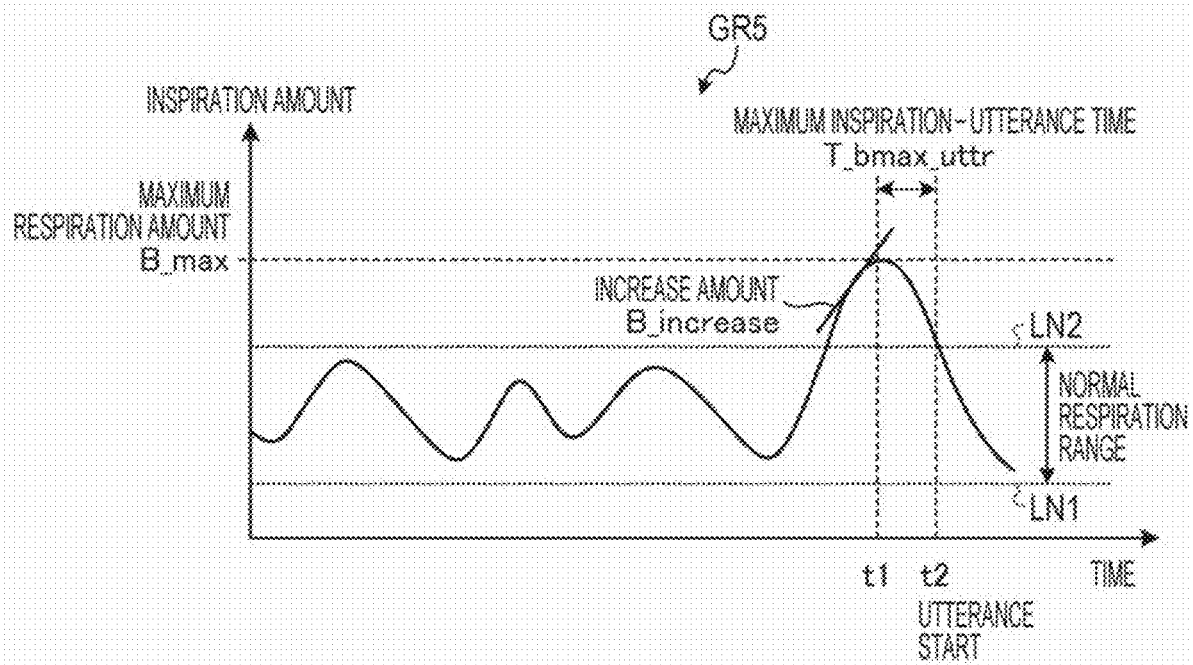
FIG. 23 is a diagram illustrating an example of the inspiration information of the user.
Figure 24:
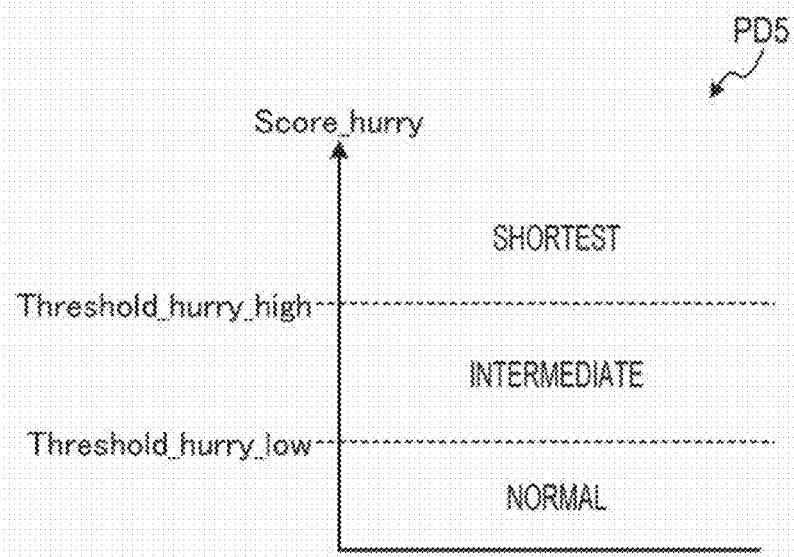
FIG. 24 is a diagram illustrating an example of the prediction using the inspiration of the user.

Hereinafter, the above-described classification processing performed by the server apparatus 100 will be specifically described with reference to FIGS. 23 and 24. FIG. 23 is a diagram illustrating an example of the inspiration information of the user. FIG. 24 is a diagram illustrating an example of the prediction using the inspiration of the user.

A graph GR5 in FIG. 23 is a graph illustrating a relationship between a time and the inspiration amount, where a horizontal axis represents time and a vertical axis represents the inspiration amount. Note that, in the graph GR5, descriptions of points similar to the graph GR1 in FIG. 2 and the graph GR2 in FIG. 12 is omitted.

For example, the maximum respiration amount "B_max" in the graph GR5 indicates the maximum inspiration amount (maximum inspiration amount) reached by the inspiration before the utterance. The maximum inspiration-utterance time "T_bmax_uttr" indicates an interval from the time when the maximum inspiration amount is reached to the time when the utterance is started (utterance start time).

For example, the increase amount "B_increase" in the graph GR5 indicates a change (increase amount) in the inspiration amount before reaching the maximum respiration amount "B_max". Note that the increase amount "B_increase" may be a change (increase amount) in the inspiration amount at the acquisition time point (current time point) of the inspiration information.

For example, the inspiration information includes the increase amount "B_increase" in FIG. 23, the maximum respiration amount "B_max", and the maximum inspiration-utterance time "T_bmax_uttr". Note that the maximum inspiration-utterance time "T_bmax_uttr" may not be included in the inspiration information. In this case, the score of "c*(1/T_bmax_uttr)" which is the term (third term) related to the maximum inspiration-utterance time "T_bmax_uttr" may be calculated as "0". Furthermore, the maximum respiration amount "B_max" may not be included. In this case, server apparatus 100 may predict maximum respiration amount "B_max" as described with reference to FIG. 2, and calculate the score using the predicted maximum respiration amount "B_max".

Using the increase amount "B_increase", the maximum respiration amount "B_max", the maximum inspiration-utterance time "T_bmax_uttr", and the following Formula (5), the server apparatus 100 calculates an utterance haste score "Score_hurry" which is a score used for the utterance prediction.

[Mathematical formula 5]

$$\text{Score\_hurry} = a*B\_max + b*B\_increase + c*(1/T\_b\text{max\_uttr}) \quad (5)$$

"a", "b", and "c" in the above formula (5) represent predetermined constants. The above Formula (5) is similar to the above Formulas (2) to (4), but the values of "a", "b", and "c" are different, and the coefficient "b" is relatively larger than the above Formulas (2) to (4) in order to largely reflect a more rapid increase in inspiration. Note that the above Formula (5) is an example of calculation of the utterance haste score "Score_hurry", and various expressions may be used to calculate the utterance haste score "Score_hurry".

Then, the server apparatus 100 classifies the inspiration of the user U1 using two thresholds of a haste low threshold "Threshold_hurry_low" and a haste high threshold "Threshold_hurry_high". The server apparatus 100 classifies the inspiration of the user U1 by comparing the utterance haste score "Score_hurry" with each threshold. In other words, the server apparatus 100 classifies the utterance type according to the value of the utterance haste score "Score_hurry".

As illustrated in a classification result PD5 in FIG. 24, the server apparatus 100 classifies the inspiration of the user U1 by comparing the utterance haste score "Score_hurry" with the haste low threshold "Threshold_hurry_low" and the haste high threshold "Threshold_hurry_high". In the example of FIG. 24, the haste low threshold "Threshold_hurry_low" is smaller than the haste high threshold "Threshold_hurry_high".

In the example of FIG. 24, the server apparatus 100 classifies the utterance as inspiration (also referred to as "shortest inspiration") having a high possibility of long sentence utterance in a case where the utterance haste score "Score_hurry" is higher than the haste high threshold "Threshold_hurry_high". In this case, the information processing system 1 predicts that the user desires the shortest processing and executes the shortest processing. For example, in a case where the user is about to execute a task in a hurry, the information processing system 1 shortens a text-to-speech (TTS) utterance and outputs a sound effect (SE).

Furthermore, in the example of FIG. 24, in a case where the utterance haste score "Score_hurry" is equal to or lower than the haste high threshold "Threshold_hurry_high" and is higher than the haste low threshold "Threshold_hurry_low", the server apparatus 100 classifies the utterance haste score into inspiration (also referred to as "intermediate inspiration") that is difficult to estimate clearly whether the utterance haste score is long or short. In this case, the information processing system 1 predicts that the user desires intermediate processing between the shortest processing and the normal processing, and executes the intermediate processing. For example, the information processing system 1 summarizes and presents the TTS utterance sentences according to the value of the utterance haste score "Score_hurry". Note that details of the processing in the middle will be described later.

Furthermore, in the example of FIG. 24, the server apparatus 100 classifies the utterance into inspiration (also referred to as "normal inspiration") having a high possibility of short sentence utterance in a case where the utterance haste score "Score_hurry" is equal to or lower than the haste low threshold "Threshold_hurry_low". In this case, the information processing system 1 predicts that the user desires normal processing and executes the shortest processing. For example, since the utterance is not an utterance in which the user is in a particularly hurry, the information processing system 1 executes a TTS utterance in which the most detailed information is conveyed to the user.

In this manner, the server apparatus 100 classifies the inspiration of the user U1 by comparing the utterance haste score "Score_hurry" with the haste low threshold "Threshold_hurry_low" and the haste high threshold "Threshold_hurry_high". Note that each threshold such as the haste low threshold "Threshold_hurry_low" and the haste high threshold "Threshold_hurry_high" may be increased or decreased in accordance with a change in the normal respiration range due to a change in the motion state of the user and the like.

As described above, the utterance haste score "Score_hurry" is a value obtained by adding the maximum respiration amount, the increase amount, and the time (maximum inspiration-utterance time) from the maximum respiration to the utterance. The server apparatus 100 classifies the respiration of the user by using the utterance haste score "Score_hurry". Therefore, the server apparatus 100 can appropriately classify the inspiration of the user and use it for selection of processing. Note that the respiration state and the utterance speed may be determined together, but this point will be described later in detail.

From here, the description will be continued returning to FIG. 21. In a case where the inspiration of the user U1 is classified into the normal inspiration, the information processing system 1 predicts that the user U1 desires the normal processing and selects the normal processing (Step S711). In the example of FIG. 21, the terminal device 10 performs output in normal processing such as "How can I help?". Then, the user U1 makes an utterance (Step S731).

Furthermore, in a case where the inspiration of the user U1 is classified into the shortest inspiration, the information processing system 1 predicts that the user U1 desires the shortest processing and selects the shortest processing (Step S721). In the example of FIG. 21, the terminal device 10 outputs only a predetermined SE (sound effect). Then, the user U1 makes an utterance (Step S731).

Furthermore, in a case where the inspiration of the user U1 is classified into the intermediate inspiration, it is predicted that the user desires intermediate processing between the shortest processing and the normal processing, and the intermediate processing is executed. This point will be described below.

In a case where the inspiration of the user U1 is classified into the intermediate inspiration, the information processing system 1 summarizes and presents the TTS utterance sentences according to the value of the utterance haste score "Score_hurry". For example, the information processing system 1 summarizes a TTS utterance using the value of the utterance haste score "Score_hurry".

Note that the information processing system 1 may calculate the utterance haste score "Score_hurry", which is a score used for utterance prediction, by using the following Formula (6) instead of the above Formula (5).

[Mathematical formula 6]

$$\text{Score\_hurry}=a*B\_\max+b*B\_\text{increase}+c*(1/T\_b\_\max\_\text{uttr})+d*V\_\text{uttr} \quad (6)$$

"a", "b", "c", and "d" in the above Formula (6) represent predetermined constants. "V_uttr" in the above Formula (6) indicates an index (the number of utterances per unit time) of how many characters are uttered per hour, and is calculated by using the following Formula (7), for example.

[Mathematical formula 7]

$$V\_\text{uttr}=(\text{Character number of the utterance}/(T\_\text{uttr\_end}-T\_\text{uttr\_start}) \quad (7)$$

Figure 25:
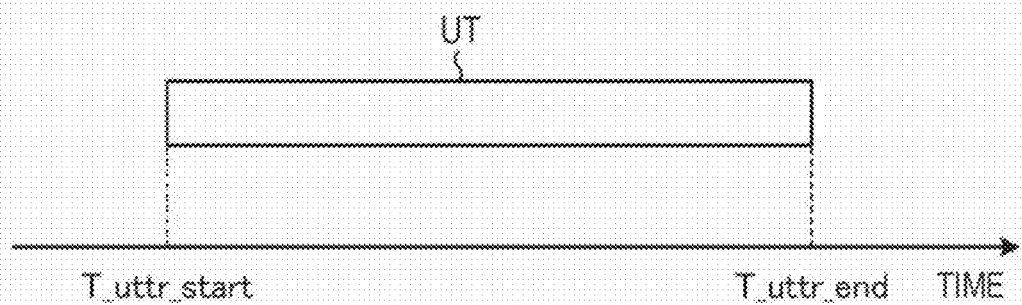
FIG. 25 is a diagram illustrating an example of a relationship between a length of an utterance of a user and the number of characters.

Formula (7) will be described with reference to FIG. 25. FIG. 25 is a diagram illustrating an example of a relationship between the length of the utterance of the user and the number of characters. An utterance UT in FIG. 25 conceptually indicates an utterance by the user. FIG. 25 illustrates that the utterance UT has been made from the start time "T_uttr_start" to the end time "T_uttr_end". That is, "T_uttr_end−T_uttr_start" in Formula (7), which is a value obtained by subtracting the start time "T_uttr_start" from the end time "T_uttr_end", indicates the length of the utterance. "Character number of the utterance" in Formula (7) indicates the number of words included in utterance UT.

As described above, "V_uttr" in the above Formula (7) indicates the index (the number of utterances per unit time) of how many characters have been uttered per time in the utterance UT. For example, a large "V_uttr" indicates an early utterance, and a small "V_uttr" indicates a slow utterance. The information processing system 1 may also add the utterance speed to the calculation of the utterance haste score "Score_hurry" by using the above Formula (6).

The information processing system 1 summarizes the TTS utterance, using the utterance haste score "Score_hurry" calculated using either Formula (5) above or Formula (6) above. Note that the information processing system 1 may summarize the sentence or may use an application programming interface (API) and the like provided by an external service.

The information processing system 1 may calculate a shortening target value using the following Formula (8).

[Mathematical formula 8]

$$\text{Abbrev\_target}=e*(1/\text{Score\_hurry}) \quad (8)$$

"e" in the above Formula (8) represents a predetermined constant. A value of "Abbrev_target" in the above Formula (6) is the shortening target value. "Abbrev_target" is calculated to be shorter (smaller) as the user is in a hurry.

Then, the information processing system 1 summarizes the TTS utterance on the basis of the value of "Abbrev_target". For example, the information processing system 1 summarizes the TTS utterance by using the following Formula (9).

[Mathematical formula 9]

$$\text{Response\_abbrev}=\text{Shorten\_API(original\_response, Abbrev\_target)} \quad (9)$$

"Shorten_API" in the above Formula (9) indicates a predetermined function (API) used for summary generation. Furthermore, "original_response" in the above Formula (9) indicates the TTS response before the summary. "Response_abbrev" in the above Formula (9) indicates a summary of the TTS utterance output by Shorten_API. In this case, the information processing system 1 uses "Response_abbrev" output by Shorten_API as the TTS summary.

For example, in a case where the inspiration of the user U1 is classified into the intermediate inspiration, the information processing system 1 outputs "Response_abbrev" output by Shorten_API. For example, the terminal device 10 outputs the TTS summary corresponding to "Response_abbrev".

In this manner, the information processing system 1 estimates a state in which the user desires the turn take at what speed from the inspiration state before the utterance, and adjusts the TTS response length. Furthermore, in a case where the user desires to quickly complete a task, the information processing system 1 switches to a short TTS response or a response with an SE to shorten a task achievement time. Therefore, the information processing system 1 can improve usability. Note that, since some sentences cannot be summarized into an expected length, in that case, the information processing system 1 may adjust a reproduction speed of the TTS to shorten the time.

Next, an example of FIG. 22 will be described. FIG. 22 illustrates a modification example of the system response (Text-To-Speech). Specifically, FIG. 22 illustrates an example of an action response change at the time of receiving the utterance.

First, in the example of FIG. 22, the server apparatus 100 acquires the inspiration information indicating the inspiration before the utterance of the user U1. For example, the server apparatus 100 acquires the inspiration information indicating the inspiration of the user U1 from the terminal device 10 used by the user U1.

The inspiration before the utterance of the user U1 is performed (Step S801), and then, the user U1 utters WUW (Step S802). The server apparatus 100 performs the classification processing using the inspiration information of the user U1. The server apparatus 100 calculates the score using the inspiration information. Then, the server apparatus 100 classifies the inspiration of the user U1 by comparing the calculated score with the threshold. The server apparatus 100 classifies the inspiration of the user U1 on the basis of a magnitude relationship between the calculated score and each threshold. Note that the classification processing is similar to that in FIG. 21, and thus description thereof is omitted.

In a case where the inspiration of the user U1 is classified into the normal inspiration, the information processing system 1 predicts that the user U1 desires the normal processing and selects the normal processing (Step S811). In the example of FIG. 22, the terminal device 10 displays information on the display DP (display unit 16) and performs output in normal processing such as "OK, here's the result. One new movie and two music". As described above, in the normal processing, the terminal device 10 displays the information in response to the request of the user, and also outputs a voice regarding the information (TTS utterance).

Furthermore, in a case where the inspiration of the user U1 is classified into the shortest inspiration, the information processing system 1 predicts that the user U1 desires the shortest processing and selects the shortest processing (Step S821). In the example of FIG. 22, the terminal device 10 displays information on the display DP (display unit 16) and outputs only a predetermined SE (sound effect). As described above, in the normal processing, the terminal device 10 displays the information for the request of the user and outputs only the notification sound to the user.

Furthermore, in a case where the inspiration of the user U1 is classified into the intermediate inspiration, it is predicted that the user desires intermediate processing between the shortest processing and the normal processing, and the intermediate processing as described above is executed. For example, in a case where the inspiration of the user U1 is classified into the intermediate inspiration, the terminal device 10 also performs voice output of the summary of the TTS utterance together with display of information in response to the request of the user.

As described above, in the case of the terminal including the display DP, the shortest response is the SE. Note that, in the case of a terminal without a display, the shortest response may be a minimum amount of TTS utterance whose state can be known.

As described above, the information processing system 1 estimates a state in which the user desires the turn take at what speed from the inspiration state before the utterance, and when the user is in a hurry, the information processing system 1 summarizes and shortens the TTS response after the execution of the action or notifies the TTS response by the SE. Therefore, the information processing system 1 can improve usability.

2. Other Embodiments

The processing according to each of the above-described embodiments may be performed in various different forms (modifications) other than the above-described embodiments and modification examples.

2-1. Configuration Example in which Prediction Processing and the Like are Performed on Client Side In one embodiment, the case where the server apparatus 100 performs the prediction processing, the classification processing, and the like has been described as an example of the system configuration, but the terminal device 10 may perform the prediction processing and the classification processing. That is, the terminal device 10 which is a client side device may be an information processing apparatus that performs the prediction processing and the classification processing described above. As described above, the system configuration of the information processing system 1 is not limited to the configuration in which the server apparatus 100, which is a device on the server side, performs the prediction processing and the classification processing, and may be a configuration in which the terminal device 10, which is a device on the client side, performs the prediction processing and the classification processing described above.

In a case where the terminal device 10 is an information processing apparatus that performs the above-described prediction processing and classification processing, the information processing system 1 predicts the utterance and classifies inspiration on the client side (terminal device 10). Then, the server side (server apparatus 100) acquires information of the prediction result and the classification result from the terminal device 10 and performs various types of processing. In this case, the terminal device 10 may include a prediction unit that implements a function similar to that of the prediction unit 132 described above and a selection unit that implements a function similar to that of the selection unit 133. Furthermore, in this case, the server apparatus 100 may not include the prediction unit 132 or the selection unit 133.

Furthermore, the information processing system 1 may have a system configuration in which the utterance is predicted on the client side (terminal device 10) and the inspiration is classified on the server side (server apparatus 100). In this case, the terminal device 10 which is a client side device may be an information processing apparatus that performs the above-described prediction processing, and the server apparatus 100 which is a server side device may be an information processing apparatus that performs the above-described classification processing. In this case, the prediction unit of the terminal device 10 performs the prediction processing, and the prediction unit 132 of the server apparatus 100 performs the classification processing.

Note that the above is an example, and any device may perform each processing in the information processing system 1. As described above, the information processing system 1 may have a system configuration in which either the client-side device (terminal device 10) or the server-side device (server apparatus 100) performs each process.

2-2. Other Configuration Examples

Note that, in the above example, a case where the server apparatus 100 and the terminal device 10 are separate bodies has been described, but these devices may be integrated.

2-3. Others

Furthermore, among the processes described in the above embodiments, all or part of the processes described as being performed automatically can be performed manually, or all or part of the processes described as being performed manually can be performed automatically by a known method. In addition, the processing procedure, specific name, and information including various data and parameters illustrated in the document and the drawings can be arbitrarily changed unless otherwise specified. For example, the various types of information illustrated in each figure are not limited to the illustrated information.

Furthermore, each component of each device illustrated in the drawings is functionally conceptual, and is not necessarily physically configured as illustrated in the drawings. That is, a specific form of distribution and integration of each device is not limited to the illustrated form, and all or a part thereof can be functionally or physically distributed and integrated in an arbitrary unit according to various loads, usage conditions, and the like.

Furthermore, the above-described embodiments and modification examples can be appropriately combined within a range in which the processing contents do not contradict each other.

Furthermore, the effects described in the present specification are merely examples and are not limited, and other effects may be provided.

3. Effects According to Present Disclosure

As described above, the information processing apparatus (the server apparatus 100 in one embodiment) according to the present disclosure includes the acquisition unit (the acquisition unit 131 in one embodiment) and the prediction unit (the prediction unit 132 in one embodiment). The acquisition unit acquires the inspiration information indicating the inspiration of the user. The prediction unit predicts whether or not the user utters after the inspiration of the user on the basis of the inspiration information acquired by the acquisition unit.

As described above, the information processing apparatus according to the present disclosure predicts whether or not the user utters after the inspiration of the user on the basis of the inspiration information indicating the inspiration of the user. In this manner, the information processing apparatus can appropriately predict the presence or absence of the utterance of the user by predicting whether or not there is a subsequent utterance of the user on the basis of the inspiration state of the user.

Furthermore, the acquisition unit acquires the inspiration information including the increase amount of the inspiration of the user. The prediction unit predicts, on the basis of the increase amount, whether or not the user utters after inspiration. In this manner, the information processing apparatus can accurately predict the presence or absence of the utterance of the user by using the increase amount of the inspiration of the user.

Furthermore, the acquisition unit acquires the inspiration information including the inspiration amount of the user. The prediction unit predicts whether or not the user utters after the inspiration on the basis of the inspiration amount. As described above, the information processing apparatus can accurately predict the presence or absence of the utterance of the user by using the inspiration amount of the inspiration of the user.

Furthermore, the acquisition unit acquires the inspiration information including the initial inspiration amount at the start time point of the inspiration of the user. The prediction unit predicts whether or not the user utters after the inspiration on the basis of the initial inspiration amount. In this manner, the information processing apparatus can accurately predict the presence or absence of the utterance of the user by using the initial inspiration amount of the inspiration of the user.

Furthermore, the prediction unit predicts whether or not the user utters after the inspiration using the score calculated on the basis of the inspiration information. In this manner, the information processing apparatus can appropriately predict the presence or absence of the utterance of the user by using the score calculated on the basis of the inspiration information.

Furthermore, in a case where the comparison result between the score and the threshold satisfies a predetermined condition, the prediction unit predicts that the user utters after inspiration. In this manner, the information processing apparatus can appropriately predict the presence or absence of the utterance of the user by predicting the utterance of the user on the basis of the comparison between the score and the threshold.

Furthermore, the information processing apparatus according to the present disclosure includes an execution unit (the execution unit 134 in one embodiment). The execution unit executes processing according to a prediction result by the prediction unit. As described above, the information processing apparatus can execute appropriate processing according to whether or not the user utters by executing processing according to the prediction result of the presence or absence of the utterance of the user.

Furthermore, in a case where the prediction unit predicts that the user utters after the inspiration, the execution unit executes pre-processing regarding the voice recognition before the inspiration of the user ends. As described above, in a case where it is predicted that the user utters, the information processing apparatus can prepare for the voice recognition prior to the utterance of the user and improve usability by executing the pre-processing regarding the voice recognition before the end of inspiration.

Furthermore, in a case where the prediction unit predicts that the user utters after the inspiration, the execution unit executes pre-processing regarding the voice recognition. As described above, in a case where it is predicted that the user utters, the information processing apparatus can prepare for the voice recognition according to the prediction by executing the pre-processing regarding the voice recognition, and usability can be improved.

Furthermore, the execution unit executes pre-processing before the user finishes the inspiration. As described above, in a case where it is predicted that the user utters, the information processing apparatus can prepare for the voice recognition prior to the utterance of the user and improve usability by executing the pre-processing regarding the voice recognition before the end of inspiration.

Furthermore, the prediction unit classifies the inspiration of the user on the basis of the inspiration information. In this manner, the information processing apparatus classifies the inspiration state of the user, so that the subsequent processing can be executed using the result of classifying the inspiration state of the user.

Furthermore, the acquisition unit acquires the inspiration information including the maximum inspiration amount of the user. The prediction unit classifies the inspiration of the user on the basis of the maximum inspiration amount. In this manner, the information processing apparatus can accurately classify the inspiration of the user by using the maximum inspiration amount of the user.

Furthermore, the acquisition unit acquires the time point information indicating the utterance start time point after the inspiration of the user. The prediction unit classifies the inspiration of the user on the basis of the interval between the time point of the maximum inspiration amount and the utterance start time point. As described above, the information processing apparatus can accurately classify the inspiration of the user by using the information on the interval between the time point of the maximum inspiration amount and the utterance start time point.

Furthermore, the acquisition unit acquires the utterance information including the length and the number of characters of the utterance after the inspiration of the user. The prediction unit classifies the inspiration of the user on the basis of the length of the utterance and the number of characters. In this manner, the information processing apparatus can accurately classify the inspiration of the user by using the length of the utterance and the number of characters after the inspiration of the user.

Furthermore, the prediction unit classifies the inspiration of the user into any of a plurality of types including at least the request type inspiration and the non-request type inspiration. In this manner, the information processing apparatus can appropriately classify the inspiration situation of the user by classifying the inspiration of the user into any of a plurality of types including the request type inspiration and the non-request type inspiration.

Furthermore, the prediction unit classifies the inspiration of the user into any of a plurality of types including at least the long sentence type inspiration and the short sentence type inspiration. In this manner, the information processing apparatus can appropriately classify the inspiration situation of the user by classifying the inspiration of the user into any of a plurality of types including the long sentence type inspiration and the short sentence type inspiration.

Furthermore, the prediction unit classifies the inspiration of the user into at least one of a plurality of types including the normal processing requesting inspiration and the shortened processing requesting inspiration. In this manner, the information processing apparatus can appropriately classify the inspiration situation of the user by classifying the inspiration of the user into any one of a plurality of types including the normal processing requesting inspiration and the shortened processing requesting inspiration.

Furthermore, the information processing apparatus according to the present disclosure includes a selection unit (the selection unit 133 in one embodiment). The selection unit performs selection processing according to a classification result by the prediction unit. In this manner, the information processing apparatus can perform appropriate selection according to whether or not the user utters by executing the selection processing according to the prediction result of the presence or absence of the utterance of the user.

Furthermore, the selection unit selects processing to be executed according to a classification result by the prediction unit. In this manner, the information processing apparatus can appropriately select the processing to be executed according to whether or not the user utters by selecting the processing to be executed according to the classification result by the prediction unit.

Furthermore, the selection unit selects information to be used for processing of the utterance of the user according to the classification result by the prediction unit. In this manner, the information processing apparatus can appropriately select the information to be used according to whether or not the user utters by selecting the information to be used for the processing for the utterance of the user according to the classification result by the prediction unit.

4. Hardware Configuration

Figure 26:
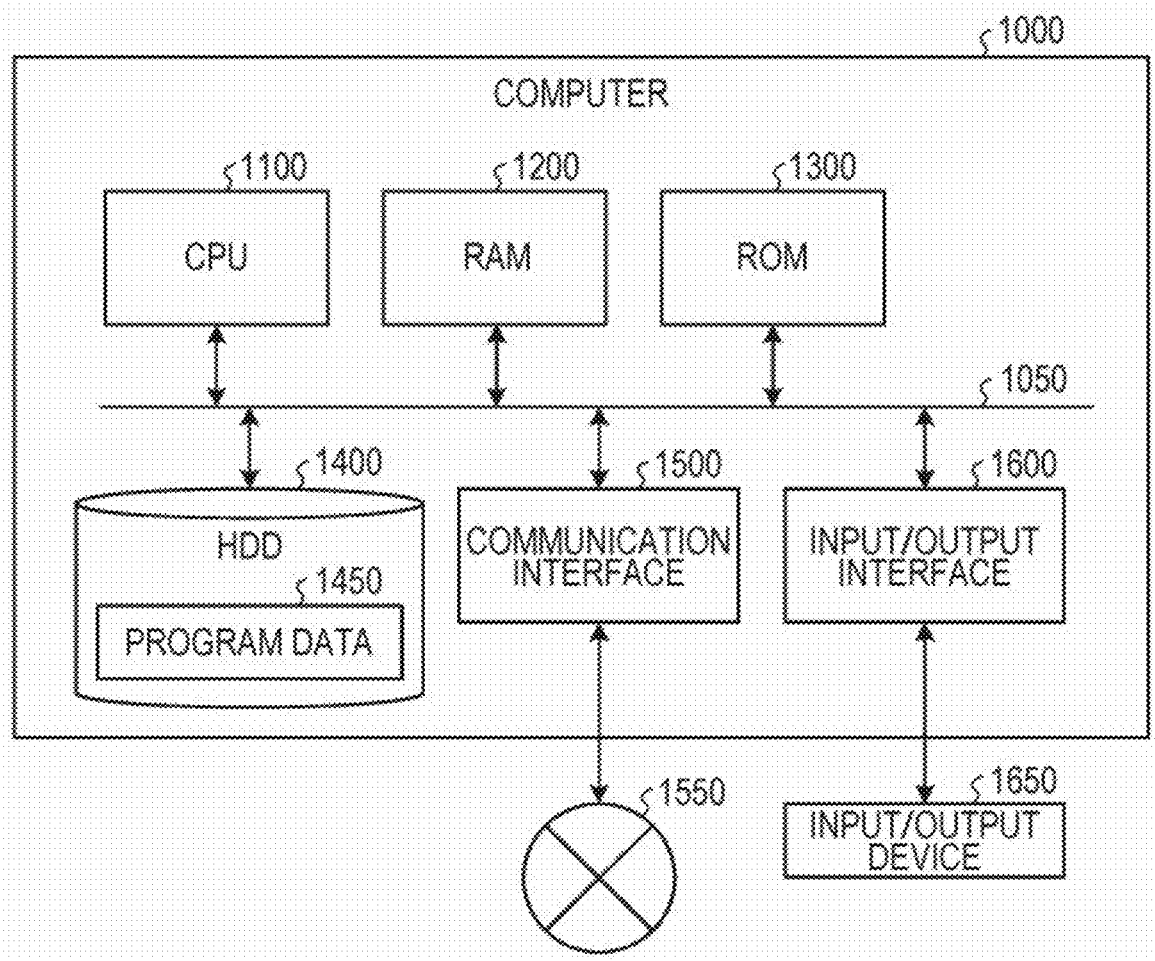
FIG. 26 is a hardware configuration diagram illustrating an example of a computer that implements functions of an information processing apparatus.

The information device such as the server apparatus 100 and the terminal device 10 according to each embodiment described above is achieved by the computer 1000 having a configuration as illustrated in FIG. 26, for example. FIG. 26 is a hardware configuration diagram illustrating an example of the computer 1000 that implements the functions of the information processing apparatus. Hereinafter, the server apparatus 100 according to one embodiment will be described as an example. The computer 1000 includes a CPU 1100, a RAM 1200, a read only memory (ROM) 1300, a hard disk drive (HDD) 1400, a communication interface 1500, and an input/output interface 1600. Each unit of the computer 1000 is connected by a bus 1050.

The CPU 1100 operates on the basis of a program stored in the ROM 1300 or the HDD 1400, and controls each unit. For example, the CPU 1100 develops a program stored in the ROM 1300 or the HDD 1400 in the RAM 1200, and executes processing corresponding to various programs.

The ROM 1300 stores a boot program such as a basic input output system (BIOS) executed by the CPU 1100 when the computer 1000 is activated, a program depending on hardware of the computer 1000, and the like.

The HDD 1400 is a computer-readable recording medium that non-transiently records a program executed by the CPU 1100, data used by the program, and the like. Specifically, the HDD 1400 is a recording medium that records an information processing program according to the present disclosure as an example of the program data 1450.

The communication interface 1500 is an interface for the computer 1000 to connect to an external network 1550 (for example, the Internet). For example, the CPU 1100 receives data from another device or transmits data generated by the CPU 1100 to another device via the communication interface 1500.

The input/output interface 1600 is an interface for connecting the input/output device 1650 and the computer 1000. For example, the CPU 1100 receives data from an input device such as a keyboard and a mouse via the input/output interface 1600. Furthermore, the CPU 1100 transmits data to an output device such as a display, a speaker, or a printer via the input/output interface 1600. Furthermore, the input/output interface 1600 may function as a media interface that reads a program and the like recorded in a predetermined recording medium (medium). The medium is, for example, an optical recording medium such as a digital versatile disc (DVD) or a phase change rewritable disk (PD), a magneto-optical recording medium such as a magneto-optical disk (MO), a tape medium, a magnetic recording medium, a semiconductor memory, and the like.

For example, in a case where the computer 1000 functions as the server apparatus 100 according to one embodiment, the CPU 1100 of the computer 1000 implements the functions of the control unit 130 and the like by executing the information processing program loaded on the RAM 1200. Furthermore, the HDD 1400 stores an information processing program according to the present disclosure and data in the storage unit 120. Note that the CPU 1100 reads the program data 1450 from the HDD 1400 and executes the program data, but as another example, these programs may be acquired from another device via the external network 1550.

Note that the present technology may also be configured as below.

(1)

An information processing apparatus including:
  an acquisition unit that acquires inspiration information indicating inspiration of a user; and
  a prediction unit that predicts whether or not the user utters after the inspiration of the user on the basis of the inspiration information acquired by the acquisition unit.

(2)

The information processing apparatus according to (1), in which
  the acquisition unit acquires the inspiration information including an increase amount of the inspiration of the user, and
  the prediction unit predicts whether or not the user utters after the inspiration on the basis of the increase amount.

(3)

The information processing apparatus according to (1) or 2, in which
  the acquisition unit acquires the inspiration information including an inspiration amount of the inspiration of the user, and
  the prediction unit predicts whether or not the user utters after the inspiration on the basis of the inspiration amount.

(4)

The information processing apparatus according to any one of (1) to (3), in which
  the acquisition unit acquires the inspiration information including an initial inspiration amount at a start time point of the inspiration of the user, and
  the prediction unit predicts whether or not the user utters after the inspiration on the basis of the initial inspiration amount.

(5)

The information processing apparatus according to any one of (1) to (4), in which
the prediction unit predicts whether or not the user utters after the inspiration using a score calculated on the basis of the inspiration information.

(6)

The information processing apparatus according to (5), in which
the prediction unit predicts that the user utters after the inspiration in a case where a comparison result between the score and a threshold satisfies a predetermined condition.

(7)

The information processing apparatus according to any one of (1) to (6) further including
an execution unit that executes processing according to a prediction result by the prediction unit.

(8)

The information processing apparatus according to (7), in which
the execution unit executes pre-processing related to voice recognition in a case where the prediction unit predicts that the user utters after the inspiration.

(9)

The information processing apparatus according to (8), in which
the execution unit executes the pre-processing before the inspiration of the user is completed.

(10)

The information processing apparatus according to any one of (1) to (9), in which
the prediction unit classifies the inspiration of the user on the basis of the inspiration information.

(11)

The information processing apparatus according to (10), in which
the acquisition unit acquires the inspiration information including a maximum inspiration amount of the inspiration of the user, and
the prediction unit classifies the inspiration of the user on the basis of the maximum inspiration amount.

(12)

The information processing apparatus according to (11), in which
the acquisition unit acquires time point information indicating an utterance start time point after the inspiration of the user, and
the prediction unit classifies the inspiration of the user on the basis of an interval between a time point of the maximum inspiration amount and the utterance start time point.

(13)

The information processing apparatus according to any one of (10) to (12), in which
the acquisition unit acquires utterance information including a length of an utterance after the inspiration of the user and the number of characters, and
the prediction unit classifies the inspiration of the user on the basis of a length of the utterance and a number of characters.

(14)

The information processing apparatus according to any one of (10) to (13), in which
the prediction unit classifies the inspiration of the user into any of a plurality of types including at least request type inspiration and non-request type inspiration.

(15)

The information processing apparatus according to any one of (10) to (13), in which
the prediction unit classifies the inspiration of the user into any of a plurality of types including at least long sentence type inspiration and short sentence type inspiration.

(16)

The information processing apparatus according to any one of (10) to (13), in which
the prediction unit classifies the inspiration of the user into any of a plurality of types including at least normal processing requesting inspiration and shortened processing requesting inspiration.

(17)

The information processing apparatus according to any one of (10) to (16), further including
a selection unit that performs selection processing according to a classification result by the prediction unit.

(18)

The information processing apparatus according to (17), in which
the selection unit selects processing to be executed according to the classification result by the prediction unit.

(19)

The information processing apparatus according to (17) or (18), in which
the selection unit selects information to be used for processing of an utterance of the user according to the classification result by the prediction unit.

(20) An information processing method including:
acquiring inspiration information indicating inspiration of a user; and
predicting whether or not the user utters after the inspiration of the user on the basis of the acquired inspiration information.

REFERENCE SIGNS LIST

1 Information processing system
100 Server apparatus (information processing apparatus)
110 Communication unit
120 Storage unit
121 Inspiration information storage unit
122 User information storage unit
123 Threshold information storage unit
124 Function information storage unit
130 Control unit
131 Acquisition unit
132 Prediction unit
133 Selection unit
134 Execution unit
135 Transmission unit
10 Terminal device
11 Communication unit
12 Input unit
13 Output unit
14 Storage unit
15 Control unit
151 Reception unit
152 Execution unit
153 Acceptance unit
154 Transmission unit
16 Display unit
17 Sensor unit
171 Respiration sensor
18 Light source unit

The invention claimed is:

1. An information processing apparatus comprising:
circuitry configured to
acquire inspiration information indicating inspiration of a user;
classify the inspiration of the user on a basis of the inspiration information;
perform selection processing according to a classification result; and
predict whether or not the user utters after the inspiration of the user on a basis of the inspiration information acquired by the acquisition unit.

2. The information processing apparatus according to claim 1, wherein the circuitry is configured to
acquire the inspiration information including an increase amount of the inspiration of the user, and
predict whether or not the user utters after the inspiration on a basis of the increase amount.

3. The information processing apparatus according to claim 1, wherein the circuitry is configured to
acquire the inspiration information including an inspiration amount of the inspiration of the user, and
predict whether or not the user utters after the inspiration on a basis of the inspiration amount.

4. The information processing apparatus according to claim 1, wherein the circuitry is configured to
acquire the inspiration information including an initial inspiration amount at a start time point of the inspiration of the user, and
predict whether or not the user utters after the inspiration on a basis of the initial inspiration amount.

5. The information processing apparatus according to claim 1, wherein the circuitry is configured to
predict whether or not the user utters after the inspiration using a score calculated on a basis of the inspiration information.

6. The information processing apparatus according to claim 5, wherein the circuitry is configured to
predict that the user utters after the inspiration in a case where a comparison result between the score and a threshold satisfies a predetermined condition.

7. The information processing apparatus according to claim 1, wherein the circuitry is configured to
execute processing according to a prediction result by the prediction unit.

8. The information processing apparatus according to claim 7, wherein the circuitry is configured to
execute pre-processing related to voice recognition in a case where the prediction unit predicts that the user utters after the inspiration.

9. The information processing apparatus according to claim 8, wherein the circuitry is configured to
execute the pre-processing before the inspiration of the user is completed.

10. The information processing apparatus according to claim 1, wherein the circuitry is configured to
acquire the inspiration information including a maximum inspiration amount of the inspiration of the user, and
classify the inspiration of the user on a basis of the maximum inspiration amount.

11. The information processing apparatus according to claim 10, wherein the circuitry is configured to
acquire time point information indicating an utterance start time point after the inspiration of the user, and
classify the inspiration of the user on a basis of an interval between a time point of the maximum inspiration amount and the utterance start time point.

12. The information processing apparatus according to claim 1, wherein the circuitry is configured to
acquire utterance information including a length of an utterance after the inspiration of the user and the number of characters, and
classify the inspiration of the user on a basis of a length of the utterance and a number of characters.

13. The information processing apparatus according to claim 1, wherein the circuitry is configured to
classify the inspiration of the user into any of a plurality of types including at least request type inspiration and non-request type inspiration.

14. The information processing apparatus according to claim 1, wherein the circuitry is configured to
classify the inspiration of the user into any of a plurality of types including at least long sentence type inspiration and short sentence type inspiration.

15. The information processing apparatus according to claim 1, wherein the circuitry is configured to
classify the inspiration of the user into any of a plurality of types including at least normal processing requesting inspiration and shortened processing requesting inspiration.

16. The information processing apparatus according to claim 1, wherein the circuitry is configured to
select processing to be executed according to the classification result by the prediction unit.

17. The information processing apparatus according to claim 1, wherein the circuitry is configured to
select information to be used for processing of an utterance of the user according to the classification result by the prediction unit.

18. An information processing method comprising:
acquiring inspiration information indicating inspiration of a user;
classifying the inspiration of the user on a basis of the inspiration information;
performing selection processing according to a classification result; and
predicting whether or not the user utters after the inspiration of the user on a basis of the acquired inspiration information.

19. An information processing apparatus comprising:
circuitry configured to
acquire inspiration information indicating inspiration of a user;
predict whether or not the user utters after the inspiration of the user on a basis of the inspiration information acquired by the acquisition unit;
acquire utterance information including a length of an utterance after the inspiration of the user and a number of characters; and
classify the inspiration of the user on a basis of a length of the utterance and the number of characters.

20. An information processing apparatus comprising:
circuitry configured to
acquire inspiration information indicating inspiration of a user;
classify the inspiration of the user into any of a plurality of types comprising:
at least request type inspiration and non-request type inspiration,
at least long sentence type inspiration and short sentence type inspiration, or at least normal processing requesting inspiration and shortened processing requesting inspiration; and predict whether or not the user utters after the inspiration of the user on a basis of the inspiration information acquired by the acquisition unit.

* * * * *